US009827566B2

(12) United States Patent
Turgeman et al.

(10) Patent No.: US 9,827,566 B2
(45) Date of Patent: Nov. 28, 2017

(54) MULTI-WELL PLATES AND METHODS OF USE THEREOF

(71) Applicant: IDEA MACHINE DEVELOPMENT DESIGN AND PRODUCTION LTD, Rehovot (IL)

(72) Inventors: Shlomo Turgeman, Rishon Letzion (IL); Ben Zion Lavi, Rehovot (IL); Eitan Sheffer, Ramat Gan (IL)

(73) Assignee: IDEA MACHINE DEVELOPMENT DESIGN AND PRODUCTION LTD., Rehovot (IL)

( * ) Notice: Subject to any disclaimer, the term of this patent is extended or adjusted under 35 U.S.C. 154(b) by 0 days.

(21) Appl. No.: 15/157,428

(22) Filed: May 18, 2016

(65) Prior Publication Data
US 2016/0266154 A1    Sep. 15, 2016

Related U.S. Application Data

(63) Continuation-in-part of application No. PCT/IB2014/066178, filed on Nov. 19, 2014.
(Continued)

(51) Int. Cl.
*B01L 3/00* (2006.01)
*G01N 31/16* (2006.01)
(Continued)

(52) U.S. Cl.
CPC ......... *B01L 3/5085* (2013.01); *B01L 3/50851* (2013.01); *B01L 3/50855* (2013.01); *G01F 22/00* (2013.01); *B01L 2200/025* (2013.01); *B01L 2200/147* (2013.01); *B01L 2300/0645* (2013.01); *B01L 2300/0654* (2013.01); *B01L 2300/0829* (2013.01); *B01L 2300/0851* (2013.01); *B01L 2300/1811* (2013.01); *B01L 2300/1822* (2013.01); *B01L 2300/1827* (2013.01); *G01G 17/04* (2013.01)

(58) Field of Classification Search
CPC ...... A61J 1/06; B01L 3/5085; B01L 3/50851; B01L 3/50855; B01L 3/00; G01F 22/00; G01N 31/16
USPC ...... 422/68.1, 547, 551, 552, 553, 554, 560, 422/561; 436/43, 500
See application file for complete search history.

(56) References Cited

U.S. PATENT DOCUMENTS

| | | | |
|---|---|---|---|
| 2005/0052646 A1* | 3/2005 | Wohlstadter | B01L 3/5085 356/311 |
| 2006/0002824 A1* | 1/2006 | Chang | B01L 3/021 422/400 |

(Continued)

FOREIGN PATENT DOCUMENTS

| | | |
|---|---|---|
| EP | 1477226 A1 | 11/2004 |
| EP | 2623204 A1 | 8/2013 |

OTHER PUBLICATIONS

International Search Report for PCT/IB2014/066178, search report mailed Jun. 29, 2015.
(Continued)

*Primary Examiner* — Brian J Sines
(74) *Attorney, Agent, or Firm* — Daniel Feigelson; Fourth Dimension IP

(57) ABSTRACT

There is provided plate equipped with a mechanism to facilitate determination of the amount of a fluid added to or removed from a well in the plate. Other embodiments are also described.

28 Claims, 21 Drawing Sheets

Related U.S. Application Data

(60) Provisional application No. 62/167,175, filed on May 27, 2015, provisional application No. 61/949,272, filed on Mar. 7, 2014, provisional application No. 61/929,086, filed on Jan. 19, 2014, provisional application No. 61/905,865, filed on Nov. 19, 2013.

(51) Int. Cl.
*A61J 1/06* (2006.01)
*G01F 22/00* (2006.01)
*G01G 17/04* (2006.01)

(56) References Cited

U.S. PATENT DOCUMENTS

| | | | |
|---|---|---|---|
| 2006/0213964 A1 | 9/2006 | Excoffier et al. | |
| 2008/0024301 A1* | 1/2008 | Fritchie | B01L 3/545 340/572.1 |
| 2008/0031774 A1 | 2/2008 | Magnant et al. | |
| 2009/0023603 A1* | 1/2009 | Selden | B01L 3/502753 506/26 |
| 2009/0322486 A1* | 12/2009 | Gerstel | B65G 1/1371 340/10.1 |
| 2010/0021352 A1* | 1/2010 | Trueeb | B01L 9/06 422/400 |
| 2010/0089803 A1* | 4/2010 | Lavi | B07C 5/3412 209/546 |
| 2010/0123551 A1* | 5/2010 | Fritchie | G01N 35/00732 340/10.1 |
| 2010/0285578 A1* | 11/2010 | Selden | B01L 3/502715 435/325 |
| 2011/0008785 A1* | 1/2011 | Tan | C12N 15/1017 435/6.12 |

OTHER PUBLICATIONS

Written Opinion for PCT/IB2014/066178, written opinion mailed Jun. 29, 2015.

* cited by examiner

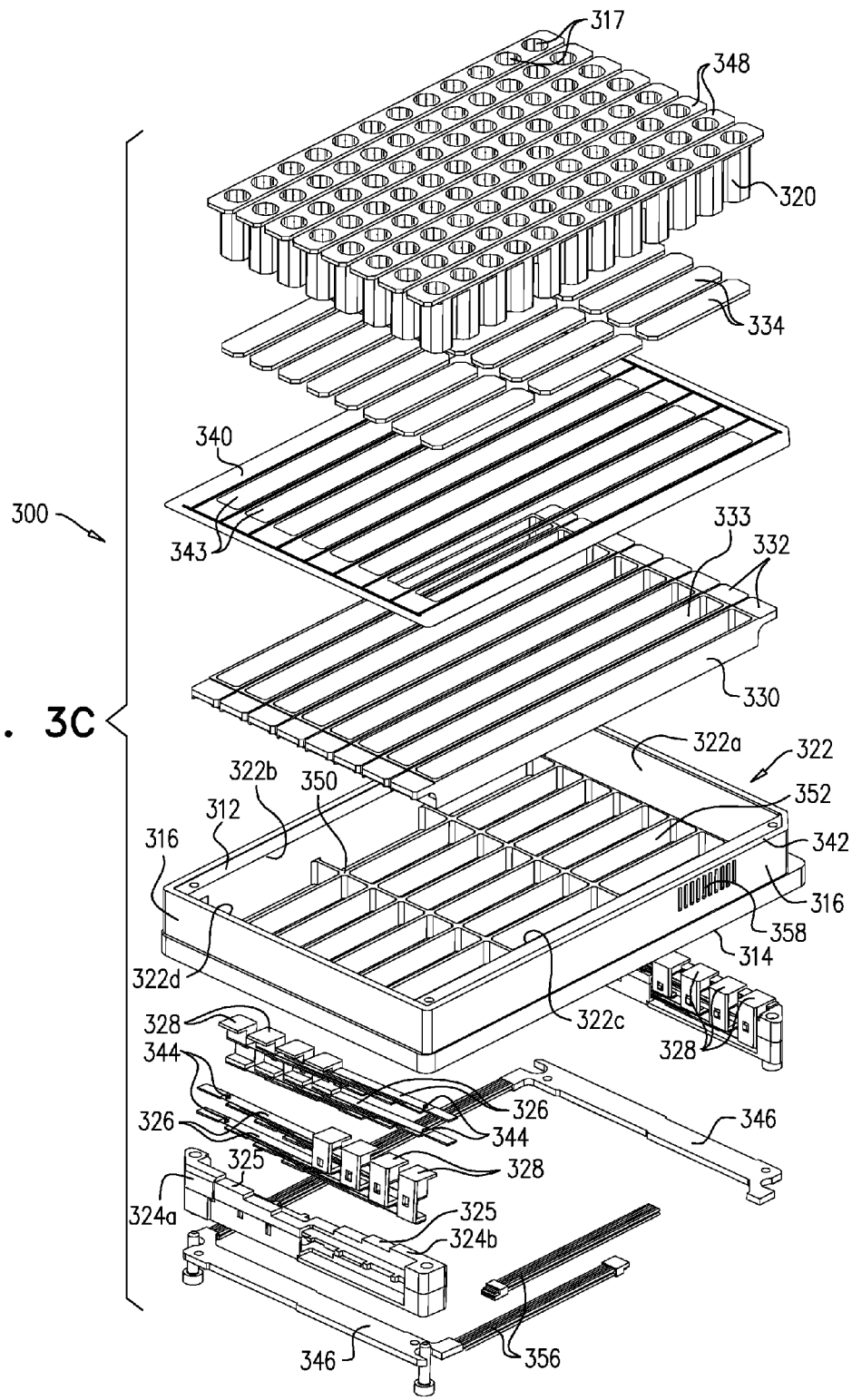

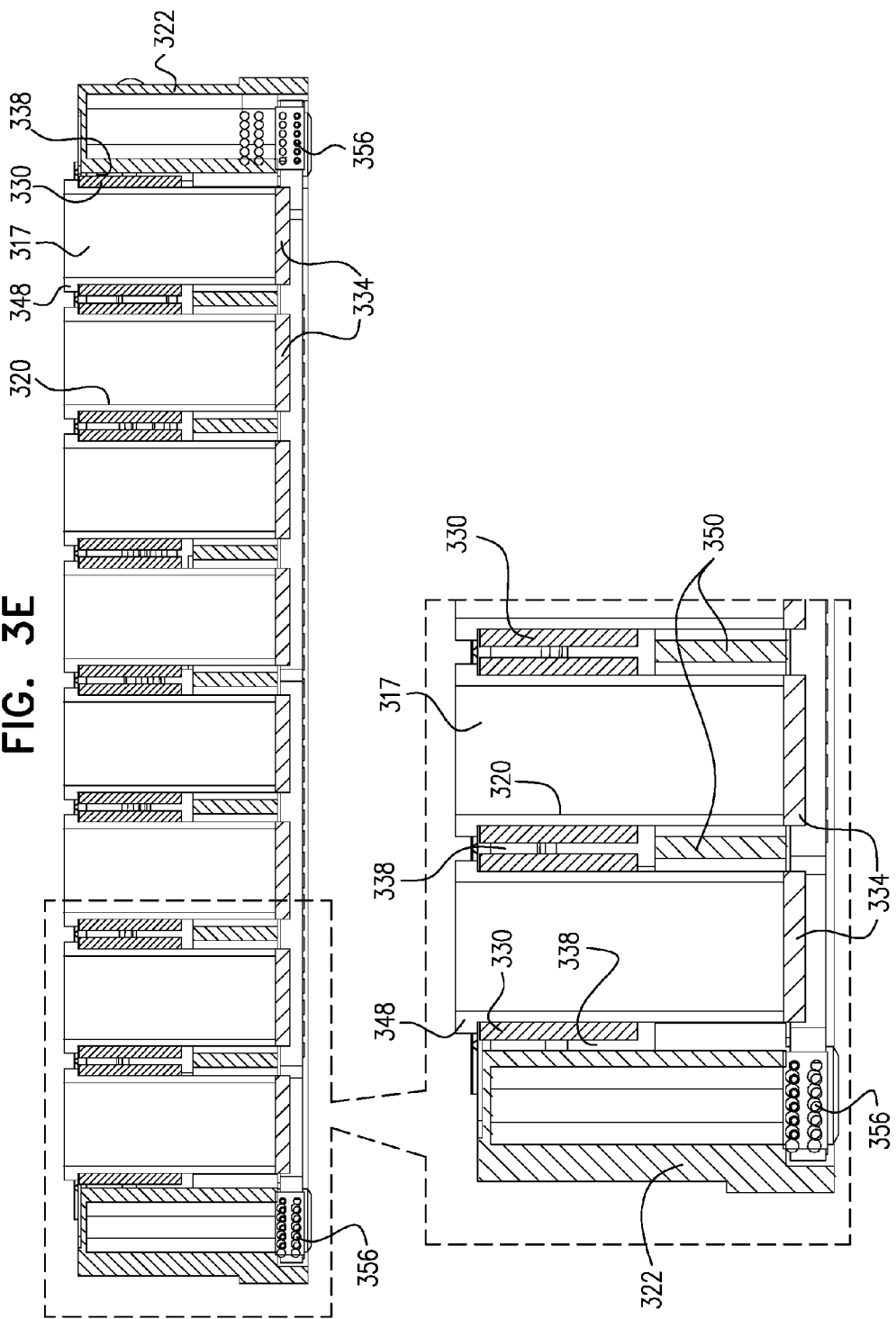

MULTI-WELL PLATES AND METHODS OF USE THEREOF

RELATED APPLICATIONS

This application is a continuation-in-part of PCT/IB2014/066178, filed Nov. 19, 2014, which claims Paris Convention priority from, and the benefit under 35 U.S.C. §120, of the following US provisional applications: No. 61/905,865, filed Nov. 19, 2013; No. 61/929,086, filed Jan. 19, 2014; and No. 61/949,272, filed Mar. 7, 2014. This application also claims the benefit of provisional application No. 62167175, filed May 27, 2015. The contents of the aforesaid PCT and provisional applications are incorporated herein by reference.

BACKGROUND

Plates containing a multiplicity of wells for holding samples of chemicals, cells or other biological materials for observation, are known in the art. Commonly, such plates have a 3:2 aspect ratio and thus contain 24 (4×6), 96 (8×12), 384 (16×24), or 1536 (32×48) wells; a typical 96-well plate is 128 mm long and 86 mm wide, and standards for the footprint and bottom outside flange of 96-well plates are described in ANSI/SBS 1-2004 and ANSI/SBS 3-2004, respectively.

Such multi-well plates, also sometimes referred to as microwell plates or microtiter plates depending on the volume of the wells, are generally constructed of plastic, e.g. polystyrene, polypropylene or polycarbonate, or a combination of such materials, in some cases also incorporating glass in the bottom portion of the plate. In many applications, the bottom of the well is transparent to a frequency of light that will be used to observe the sample. The size of wells in terms of depth, height, and total volume, as well the shape of the wells and the shape of the bottoms of the wells, varies in accordance with the particular use to which the plate is to be put.

Examples of commercial suppliers of such plates are:

Perkin-Elmer (see http://www.perkinelmer.com/CMSResources/Images/44-73879SPC_MicroplateDimensionsSummaryChart.pdf);

Sigma-Aldrich (see http://www.sigmaaldrich.com/labware/labware-products.html?TablePage=9576216); and Thermo-Scientific (see http://www.thermoscientific.com/ecomm/servlet/productscatalog_11152_81996_-1_4).

One area in which widespread use of such plates is made is high-throughput screening for the testing of compounds in drug development, binding assays for antigens and the like.

Often, in high-throughput screening and other applications, automated machinery is used to dispense a volume of liquid into some or all of the wells simultaneously, for example, by dispensing fluid simultaneously into the wells of an 8-well row in a 96-well plate or into all the wells of a 384-well plate. However, if the amount of liquid added to a specific well is incorrect, such fact may not become known until the entire experiment is completed; and if the specific well to which the incorrect amount of fluid was added is not identified, it may be necessary to disregard the results for the entire plate.

BRIEF DESCRIPTION

There is provided in accordance with an embodiment of the invention a plate, comprising a first substantially planar surface having at least one first aperture defined therein; a second substantially planar surface substantially parallel to the first substantially planar surface, the second substantially planar surface being spaced from the first substantially planar surface; at least one well located substantially within the plate, the at least one well having at least one second aperture associated with the at least one first aperture and in alignment therewith, the at least one well having a sidewall and a bottom, a major portion of the at least one well extending from the vicinity of the first substantially planar surface toward the second substantially planar surface, said major portion of the at least one well being displaceable within the region between the first and second substantially planar surfaces away from the first substantially planar surface toward the second substantially planar surface; and at least one signal provider, functionally associated with the at least one well, capable of producing a signal in response to displacement of the major portion of the at least one well away from the first surface toward the second substantially planar surface.

In some embodiments, the first surface has a plurality of first apertures defined therewithin, and a plurality of wells are located substantially within the plate, each well having a second aperture associated with a first aperture of the plurality of first apertures defined in the first surface and in alignment therewith, and each of the wells having a sidewall and a bottom, a major portion of each well extending from the vicinity of the first substantially planar surface toward the second substantially planar surface. In some embodiments, each of said major portion of each of the plurality of wells is displaceable within the region between the first and second substantially planar surfaces away from the first substantially planar surface toward the second substantially planar surface.

There is also provided in accordance with an embodiment of the invention a multiwell plate, comprising a first substantially planar surface having a plurality of first apertures defined therein; a second substantially planar surface substantially parallel to the first substantially planar surface, the second substantially planar surface being spaced from the first substantially planar surface; a plurality of wells located substantially within the plate, each well having a second aperture associated with one of the first apertures defined in the first surface and in alignment therewith, each of the wells having a sidewall and a bottom, a major portion of each well extending from the vicinity of the first substantially planar surface toward the second substantially planar surface, said major portion of each of the wells being displaceable within the region between the first and second substantially planar surfaces away from the first substantially planar surface toward the second substantially planar surface; and at least one signal provider, functionally associated with the plurality of wells, capable of producing a signal in response to displacement of at least one the well away from the first surface toward the second substantially planar surface.

In some embodiments, the first and second surfaces are spaced apart by a plurality of sidewalls extending between the first and second surfaces.

In some embodiments, movement of all the wells is coupled, so that the signal provider is capable of providing a single signal in response to displacement of any one or more of the wells. In some embodiments, movement of some of the wells is coupled into two or more groups, and the at least one signal provider comprises multiple signal providers, each capable of providing a signal in response to displacement of one of the groups. In some embodiments, movement of some of the wells is coupled into two or more groups, and the signal provider is capable of providing a separate signal in response to displacement of each one of the groups.

In some embodiments, the at least one signal provider comprises a plurality of signal providers, each associated with one well of the plurality of wells, each of the plurality of wells is independently displaceable away from the first surface, and each of the plurality of signal providers is capable of providing a signal in response to displacement of one of the plurality of wells associated therewith.

In some embodiments, the at least one signal provider is capable of providing a signal in response to placement in a well of 300 milligrams of material, 250 milligrams of material, 200 milligrams of material, 150 milligrams of material, 100 milligrams of material, 75 milligrams of material, 50 milligrams of material, 45 milligrams of material, 40 milligrams of material, 35 milligrams of material, 30 milligrams of material, 25 milligrams of material, 20 milligrams of material, 15 milligrams of material, 10 milligrams of material, 5 milligrams of material, 4 milligrams of material, 3 milligrams of material, 2 milligrams of material, or 1 milligram of material, 500 micrograms ($\mu$g) of material, 300 $\mu$g of material, 200 $\mu$g of material, or 100 $\mu$g of material.

In some embodiments, the at least one signal provider is capable of providing a signal in response to placement in a well of 300 microliters ($\mu$l) of fluid, 250 $\mu$l of fluid, 200 $\mu$l of fluid, 150 $\mu$l of fluid, 100 $\mu$l of fluid, 75 $\mu$l of fluid, 50 $\mu$l of fluid, 45 $\mu$l of fluid, 40 $\mu$l of fluid, 35 $\mu$l of fluid, 30 $\mu$l of fluid, 25 $\mu$l of fluid, 20 $\mu$l of fluid, 15 $\mu$l of fluid, 10 $\mu$l of fluid, 5 $\mu$l of fluid, 4 $\mu$l of fluid, 3 $\mu$l of fluid, 2 $\mu$l of fluid, 1 $\mu$l of fluid, 0.5 $\mu$l of fluid, 0.3 $\mu$l of fluid, 0.5 $\mu$l of fluid, or 0.1 $\mu$l of fluid.

In some embodiments, the signal provider is capable of providing a signal in response to displacement of the major portion of at least one well away from the second substantially planar surface toward the first substantially planar surface in the region between the first and second substantially planar surfaces.

In some embodiments, the at least one signal provider is capable of providing a signal in response to removal from a well of 300 milligrams of material, 250 milligrams of material, 200 milligrams of material, 150 milligrams of material, 100 milligrams of material, 75 milligrams of material, 50 milligrams of material, 45 milligrams of material, 40 milligrams of material, 35 milligrams of material, 30 milligrams of material, 25 milligrams of material, 20 milligrams of material, 15 milligrams of material, 10 milligrams of material, 5 milligrams of material, 4 milligrams of material, 3 milligrams of material, 2 milligrams of material, or 1 milligram of material, 500 micrograms ($\mu$g) of material, 300 $\mu$g of material, 200 $\mu$g of material, or 100 $\mu$g of material.

In some embodiments, the at least one signal provider is capable of providing a signal in response to removal from a well of 300 microliters ($\mu$l) of fluid, 250 $\mu$l of fluid, 200 $\mu$l of fluid, 150 $\mu$l of fluid, 100 $\mu$l of fluid, 75 $\mu$l of fluid, 50 $\mu$l of fluid, 45 $\mu$l of fluid, 40 $\mu$l of fluid, 35 $\mu$l of fluid, 30 $\mu$l of fluid, 25 $\mu$l of fluid, 20 $\mu$l of fluid, 15 $\mu$l of fluid, 10 $\mu$l of fluid, 5 $\mu$l of fluid, 4 $\mu$l of fluid, 3 $\mu$l of fluid, 2 $\mu$l of fluid, 1 $\mu$l of fluid, 0.5 $\mu$l of fluid, 0.3 $\mu$l of fluid, 0.2 $\mu$l of fluid, or 0.1 $\mu$l of fluid.

In some embodiments, at least one well in the plate is removable therefrom.

In some embodiments, the plate comprises at least one temperature sensor associated with at least one of the wells. In some embodiments, the temperature sensor is located in or on one of the wells. In some embodiments, the at least one temperature sensor is configured to provide a signal representing a temperature in the at least one well or in a vicinity thereof. In some such embodiments, the at least one temperature sensor is configured to continuously detect the temperature in the at least one well, and to periodically provide the signal representing the temperature.

In some embodiments, the plate further comprises an electronic storage element for storage of at least one signal provided by at least one of the at least one signal provider and the at least one temperature sensor.

In some embodiments, the at least one temperature sensor is configured to detect a composite temperature in a group of wells from the plurality of the wells. In this patent application, by "composite temperature" is meant a temperature that is a composite of the temperatures of the wells in the group. A composite temperature is not necessarily an average temperature for the wells in the group, although it may be an average temperature.

In some embodiments, the at least one temperature sensor comprises a single temperature sensor configured to detect a composite temperature of all the wells.

In some embodiments, the at least one temperature sensor comprises a plurality of temperature sensors, each associated with one of the plurality of wells for detecting the temperature in the one of the plurality of wells associated therewith.

In some embodiments, the plate further comprises at least one heating component associated with the at least one well, the at least one heating component being located in sufficient proximity to the at least one well to heat the at least one well or its interior. In some embodiments, the at least one heating component comprises a plurality of heating components, each associated with one well of the plurality of wells and located in sufficient proximity to the one well associated therewith to heat the one well or its interior, without substantially heating others of the plurality of wells. In some embodiments, the at least one heating component comprises a heating coil. In some embodiments, the at least one heating component is also capable of cooling the at least one well. In some embodiments, the heating component comprises a Peltier device.

In some embodiments, at least one well in the plate is removable therefrom, in a manner that does not remove from the plate a heating component associated with the at least one removable well. In some embodiments, at least one well in the plate is removable therefrom, and the heating component associated with the at least one removable well is attached to or formed integrally with the at least one well and is removable therewith.

In some embodiments, the maximum width of the well does not exceed the maximum width of said first aperture with which the well is associated. "Maximum width" in this context refers to the greatest distance present between two points on the shape that results from taking a cross-section of the well along a plane parallel to the first substantially planar surface, or, with reference to the first aperture, the greatest distance present between two points on the shape defined by the aperture in said surface.

In some embodiments, the plate further comprises an electrical port functionally associated with at least one of the at least one signal provider and the at least one temperature sensor. In some embodiments, the plate further comprises a rechargeable power supply, functionally associated with at least one of the at least one signal provider and the at least one temperature sensor, and configured to be recharged by connection thereof to a power source. In some embodiments, the rechargeable power supply is configured to be recharged when the electrical port is electrically connected to a power source.

There is also provided in accordance with an embodiment of the invention a data reader configured to receive therein a plate according embodiments of the present invention, the data reader comprising a base for placement of the plate thereon; an electrical port engageable with the electrical port of the plate for electrical engagement therewith; and a processor functionally associated with the electrical port, for processing signals obtained from at least one of the signal provider and the temperature sensor via the electrical port. In some embodiments, the processor is configured to obtain the signals directly from at least one of the signal provider and the temperature sensor via the electrical port. In some embodiments, the processor is configured to obtain the signals from an electronic storage component storing at least one signal provided by at least one of the signal provider and the temperature sensor.

In some embodiments the data reader further comprises a display functionally associated with the processor, the display configured to provide to a user information obtained from the processed signals. In some embodiments, the information comprises an indication of at least one of: (i) an amount of fluid in the plate at a specific time; (ii) an amount of fluid in at least one well at a specific time; (iii) a change in an amount of fluid in the plate over a period of time; (iv) a change in an amount of fluid in at least one well over a period of time; (v) a temperature of at least one well at a specific time; and (vi) a change in temperature of at least one well over a period of time. In some embodiments, the processor is configured to process the signals in real time and the display is configured to provide to the user the information in real-time.

There is also provided in accordance with an embodiment of the invention a plate comprising a first substantially planar surface having at least one first aperture defined therein; a second substantially planar surface substantially parallel to the first substantially planar surface, the second substantially planar surface being spaced from the first substantially planar surface; at least one well located entirely within the plate, the at least one well having a second aperture corresponding to and in alignment with one of the at least one first apertures defined in the first surface, the at least one well having a sidewall and a bottom and the at least one well extending from the first substantially planar surface toward the second substantially planar surface; and at least one heating component associated with the at least one well, which is located in sufficient proximity to the at least one well to heat the at least one well or its interior. In some embodiments, the first surface has a plurality of first apertures defined therewithin; the at least one well comprises a plurality of wells defined within the plate, each well having a second aperture corresponding to and in alignment with one first aperture from the plurality of first apertures defined in the first surface, each of the wells having a sidewall and a bottom and each well extending from the first substantially planar surface toward the second substantially planar surface; and the at least one heating component comprising a plurality of heating components such that each of the wells has one of the plurality of heating components associated therewith, each of the heating components being located in sufficient proximity to the well with which the heating component is associated to heat the well or its interior without substantially heating other wells. In some embodiments, the heating component comprises a heating coil. In some embodiments, the heating component is also capable of cooling the well. In some embodiments, the heating component comprises a Peltier device. In some embodiments, at least one well in the plate is removable therefrom, without removing from the plate a heating component associated with the at least one removable well. In some embodiments, at least one well in the plate is removable therefrom, and the heating component associated with the at least one removable well is attached to or formed integrally with the at least one well and is removable therewith.

There is also provided in accordance with an embodiment of the invention a method for measuring the amount of fluid added to a plate according to any one of the embodiments of the present invention, the method comprising recording an initial signal provided by the signal provider, and after a fluid has been added to at least one well in the plate, obtaining a second signal generated by the signal provider in response to the addition of the fluid, wherein, on the basis of a difference between the initial signal and the second signal, the amount of the fluid added to the at least one well can be calculated. In some embodiments, the method further comprises adding fluid to the plate after the recording an initial signal and before the obtaining a second signal. In some embodiments, the method further comprises on the basis of the difference between the initial signal and the second signal, calculating an amount of the fluid added to the at least one well. In some embodiments, the calculating an amount comprises calculating a volume of the fluid added to the at least one well. In some embodiments, the calculating an amount comprises calculating a mass of the fluid added to the at least one well. In some embodiments, the calculating an amount comprises calculating a volume and a mass of the fluid added to the at least one well.

There is also provided in accordance with an embodiment of the invention a method for measuring the amount of fluid lost from a plate according to any one of the embodiments of the present invention, the plate having an initial amount of fluid disposed in at least one well of the plate, the method comprising recording an initial signal provided by the signal provider at a first time; obtaining from the signal provider a second signal at a second time after the first time; and on the basis of the difference between the initial signal and the second signal, calculating an amount of the fluid lost from the at least one well of the plate. In some embodiments, the calculating an amount comprises calculating a volume of the fluid lost from the at least one well. In some embodiments, the calculating an amount comprises calculating a mass of the fluid lost from the at least one well. In some embodiments, the calculating an amount comprises calculating a volume and a mass of the fluid lost from the at least one well. In some embodiments, the method further comprises periodically repeating the step of obtaining a signal, and on the basis of the difference between signals obtained at two different times, calculating an amount of fluid lost from the at least one well in a duration between the two different times.

There is also provided in accordance with an embodiment of the invention a method comprising obtaining a baseline measurement of displacement of at least one well in a multi-well plate having disposed therein a displacement measuring assembly for measuring the displacement of at least one well in the plate in response a change in an amount of fluid in the at least one well, the baseline measurement being obtained via the displacement measuring assembly; at a time after the obtaining of the baseline measurement, obtaining a second measurement of displacement of the at least one well; and on the basis of the second measurement of displacement, calculating the change in the amount of fluid in the at least one well.

There is also provide in accordance with an embodiment of the invention a method comprising at a first time, obtaining a baseline measurement of displacement of at least one well in a multi-well plate having disposed therein a displacement measuring assembly for measuring the displacement of at least one well in the plate in response a change in an amount of fluid in the at least one well, the baseline measurement being obtained via the displacement measuring assembly; at a second time after the first time, measuring the displacement of the at least one well; and on the basis of a change in displacement between the first and second times, calculating a change in the amount of fluid in the at least one well, wherein at at least one of the first and second times, a detectable amount of fluid is present in the well. In some embodiments, the method further comprises periodically repeating the step of measuring the displacement of the at least one well at a second time, and on the basis of a change in displacement between two the measurements of displacement, calculating a change in the amount of fluid in the at least one well during a period between the two the measurements of displacement. In some embodiments, the change in the amount of fluid is due to addition of fluid to the at least one well. In some embodiments, the change in the amount of fluid is due to loss of fluid from the at least one well.

In some embodiments of the aforemention methods, the plate is a plate according to any one of the embodiments of the present invention.

In some embodiments of the aforemention methods, the signal provider is sufficiently sensitive to detect a change of 300 microliters (μl), 250 μl, 200 μl, 150 μl, 100 μl, 75 μl, 50 μl, 40 μl, 35 μl, 30 μl, 25 μl, 20 μl, 15 μl, 10 μl, 5 μl, 4 μl, 3 μl, 2 μl, 1 μl, 0.5 μl of fluid, 0.3 μl of fluid, 0.2 μl of fluid, or 0.1 μl of fluid, in the volume of fluid in the at least one well.

In some embodiments of the aforemention methods, the signal provider is sufficiently sensitive to detect a change of 300 milligrams (mg), 250 mg, 200 mg, 150 mg, 100 mg, 75 mg, 50 mg, 45 mg, 40 mg, 35 mg, 30 mg, 25 mg, 20 mg, 15 mg, 10 mg, 5 mg, 4 mg, 3 mg, 2 mg, 1 mg, 500 micrograms (μg), 300 μg, 200 μg, or 100 μg in the mass of fluid in the at least one well.

In some embodiments of the aforemention methods, the method further comprises detecting a temperature in at least one well. In some embodiments, the method further comprises detecting the temperature in the at least one well at at least two different points in time. In some embodiments, the method further comprises adjusting the temperature of an individual well in response to the detecting the temperature.

In some embodiments of the aforemention methods, at least one well in the multi-well plate is removable therefrom.

Unless otherwise defined, all technical and scientific terms used herein have the same meaning as commonly understood by one of ordinary skill in the art to which the invention pertains. In case of conflict, the specification, including definitions, will take precedence.

As used herein, the terms "comprising", "including", "having" and grammatical variants thereof are to be taken as specifying the stated features, integers, steps or components but do not preclude the addition of one or more additional features, integers, steps, components or groups thereof. These terms encompass the terms "consisting of" and "consisting essentially of".

As used herein, the indefinite articles "a" and "an" mean "at least one" or "one or more" unless the context clearly dictates otherwise.

Embodiments of methods and/or devices of the invention may involve performing or completing selected tasks manually, automatically, or a combination thereof. Some embodiments of the invention are implemented with the use of components that comprise hardware, software, firmware or combinations thereof. In some embodiments, some components are general-purpose components such as general purpose computers or monitors. In some embodiments, some components are dedicated or custom components such as circuits, integrated circuits or software.

For example, in some embodiments, some of an embodiment is implemented as a plurality of software instructions executed by a data processor, for example which is part of a general-purpose or custom computer. In some embodiments, the data processor or computer comprises volatile memory for storing instructions and/or data and/or a non-volatile storage, for example, a magnetic hard-disk and/or removable media, for storing instructions and/or data. In some embodiments, implementation includes a network connection. In some embodiments, implementation includes a user interface, generally comprising one or more of input devices (e.g., allowing input of commands and/or parameters) and output devices (e.g., allowing reporting parameters of operation and results.

BRIEF DESCRIPTION OF THE FIGURES

Some embodiments of the invention are described herein with reference to the accompanying figures. The description, together with the figures, makes apparent to a person having ordinary skill in the art how some embodiments of the invention may be practiced. The figures are for the purpose of illustrative discussion and no attempt is made to show structural details of an embodiment in more detail than is necessary for a fundamental understanding of the invention. For the sake of clarity, some objects depicted in the figures may not be to scale.

In the Figures:

FIG. 3C is an exploded view of the multi-well plate of FIGS. 3A and 3B;

FIGS. 3E, 3F, and 3G are sectional views of the multi-well plate of FIGS. 3A to 3C, taken along section lines IIIE-IIIE, IIIF-IIIF, and IIIG-IIIG in FIG. 3A;

DESCRIPTION OF SOME EMBODIMENTS OF THE INVENTION

Figure 1:
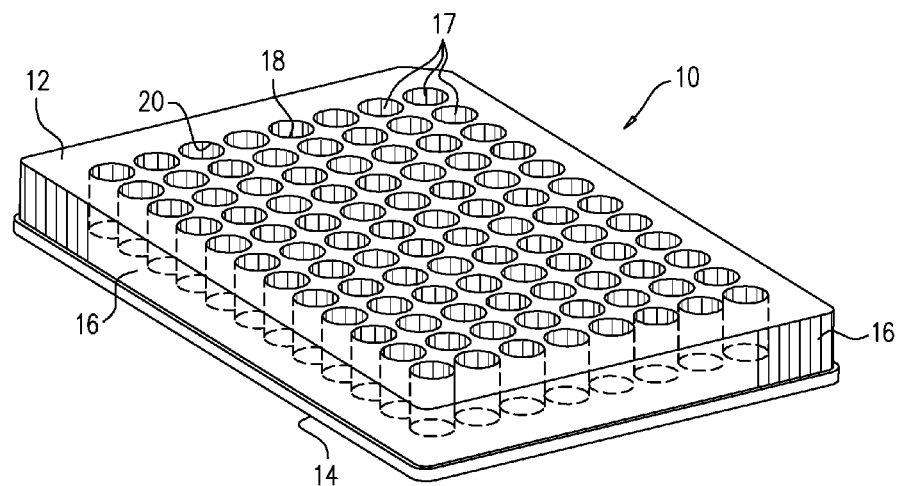
FIG. 1 is a perspective view of a multi-well plate of the prior art.

The principles, uses and implementations of the teachings herein may be better understood with reference to the accompanying description and figures. Upon perusal of the description and figures present herein, one skilled in the art is able to implement the invention without undue effort or experimentation.

Before explaining at least one embodiment of the invention in detail, it is to be understood that the invention is not limited in its applications to the details of construction and the arrangement of the components and/or methods set forth in the following description and/or illustrated in the drawings and/or the Examples. The invention can be implemented with other embodiments and can be practiced or carried out in various ways. It is also understood that the phraseology and terminology employed herein is for descriptive purpose and should not be regarded as limiting.

Reference is now made to FIG. 1, which is a perspective view of a multi-well plate of the prior art. FIG. 1 shows a typical 96-well plate 10 as is known in the art. Plate 10 has an upper surface 12, a lower surface 14, and a plurality of sides 16 between the upper and lower surfaces 12 and 14. Extending between surfaces 12 and 14 are a plurality of wells 17, ninety-six such wells in all, arranged in eight rows of twelve wells each. Each well has an aperture 18 formed in upper surface 12, to facilitate the injection of sample fluid into the well. Plate 10 may be made of plastic, such as polystyrene or polycarbonate, or a combination of such materials; in some cases, it may have a glass bottom. Typically the lower surface 14 is transparent at at least some particular frequency or range of frequencies of light at which the sample placed in the well will be observed, although for some uses such transparency may not be necessary. Sides 20 of the wells 17 may or may not be transparent, depending on the nature of the sample and the type of observations to be made.

The wells are typically of circular cross-section in the x-y plane and of essentially cylindrical shape, but they may have cross-sections of other shapes, such as rectangular or square, and they may have different shapes along their lengths, for example the sides of the wells may taper from the upper opening to the bottom of the well along a portion thereof or along their entire length. The bottoms of the wells are typically flat but, depending upon the intended use of the plate, may be formed with other shapes, such as conical, frusto-conical, or spherical bottoms (i.e. V- or U-shaped bottom cross sections when viewed along the z-axis).

A plate such as plate 10 is typically of 85-86 mm width and 127-128 mm length, with an overall height that varies within the range of 10-20 mm, and with the centers of the wells being spaced 9 mm apart along the x and y axes. Standards for the footprint and bottom outside flange of 96-well microplates are described in ANSI/SBS 1-2004 and ANSI/SBS 3-2004, respectively. That said, the plate may have different length, width, and height dimensions, may have a different distance between the wells, and may have a different number of wells, as is suitable for the specific application or use of the plate. For example, the plate may be a 384-well plate including 384 wells, arranged in sixteen rows of twenty four wells each, such that the centers of the wells are 4.5 mm apart along the x and y axes. Standards for the footprint and bottom outside flange of 384-well microplates are described in ANSI/SBS 1-2004 and ANSI/SBS 3-2004, respectively.

Figure 2A:
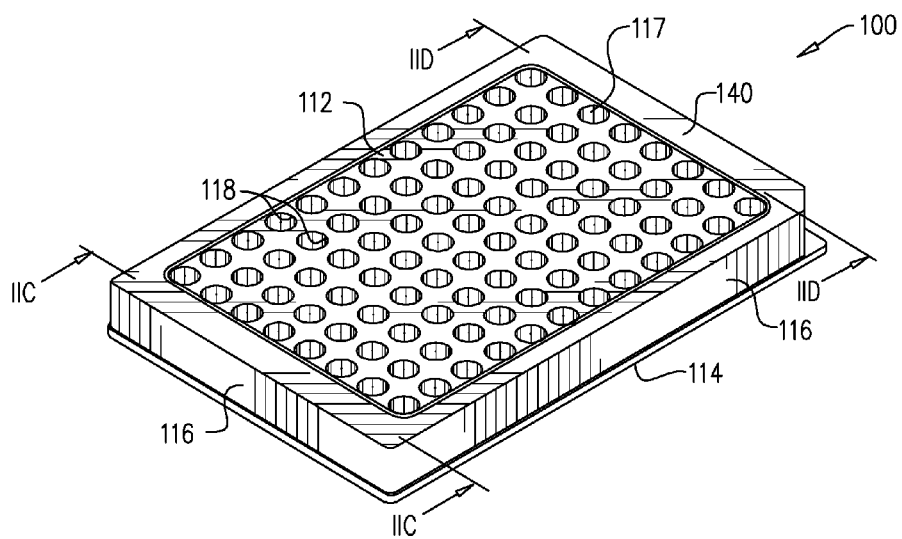
FIG. 2A is a perspective view of a multi-well plate constructed and operative in accordance with an embodiment of the invention.
Figure 2B:
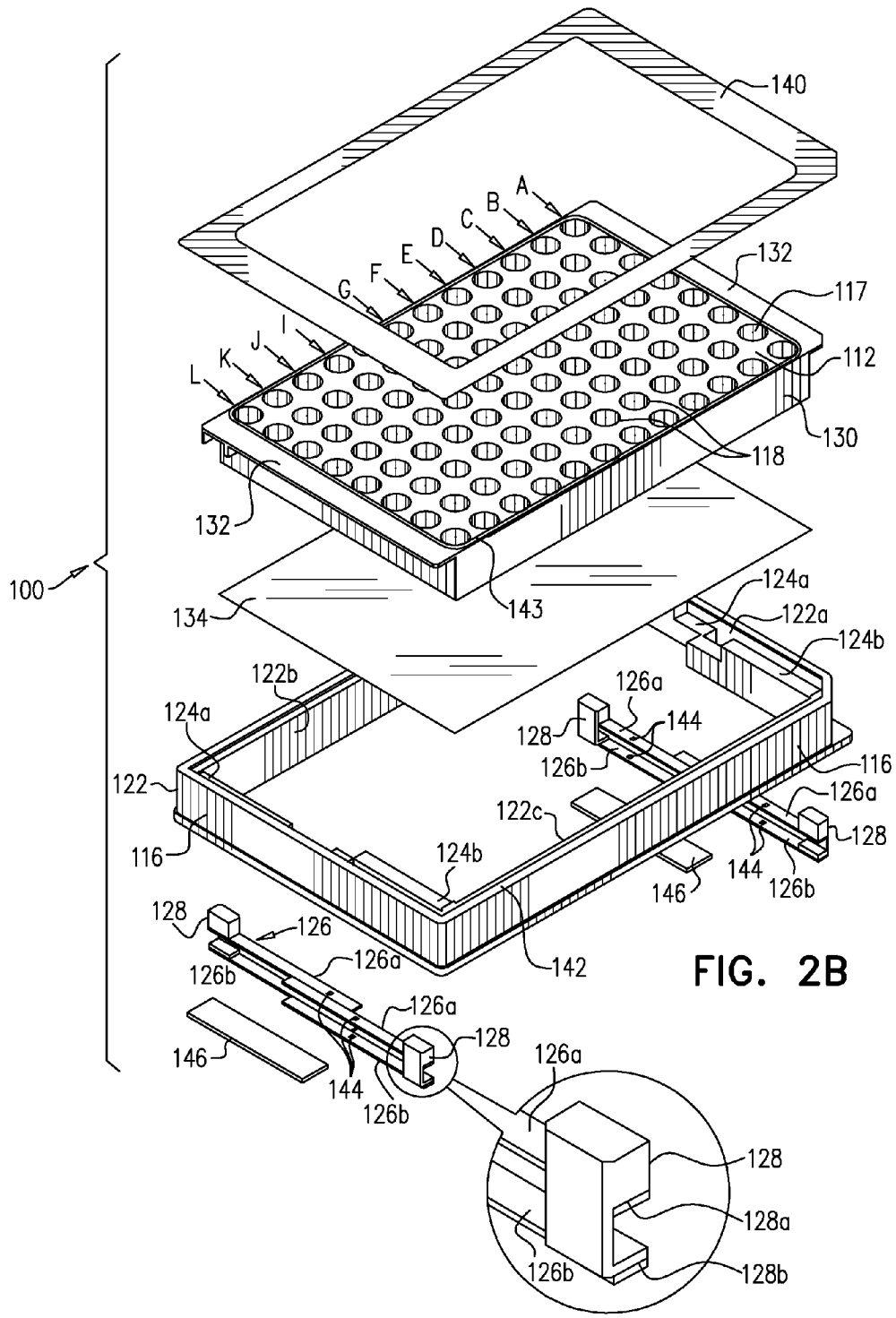
FIG. 2B is an exploded view of the multi-well plate of FIG. 2A.
Figure 2C:
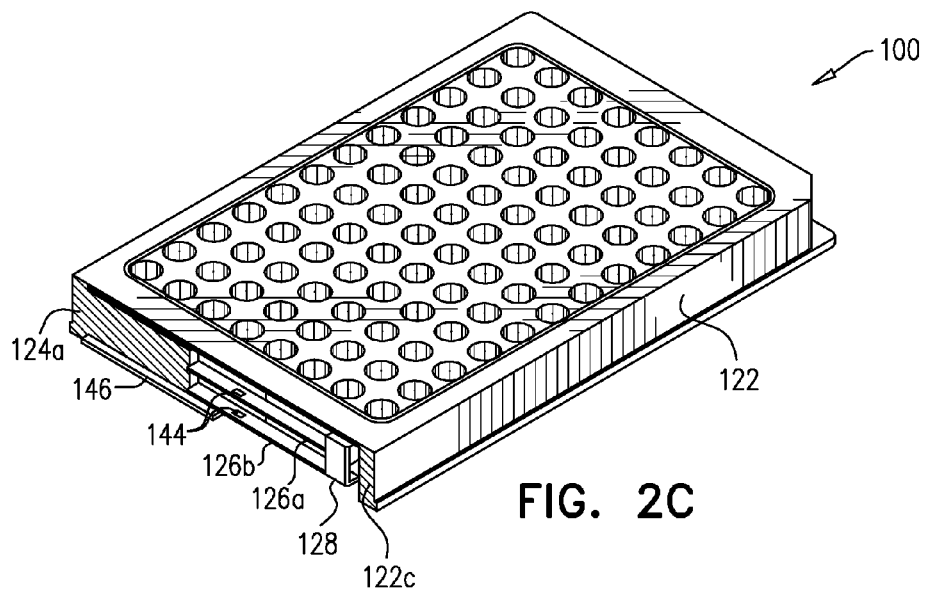
FIGS. 2C and 2D are perspective sectional views of the multi-well plate of FIGS. 2A and 2B, taken along section lines IIC-IIC and IID-IID in FIG. 2A, respectively.
Figure 2D:
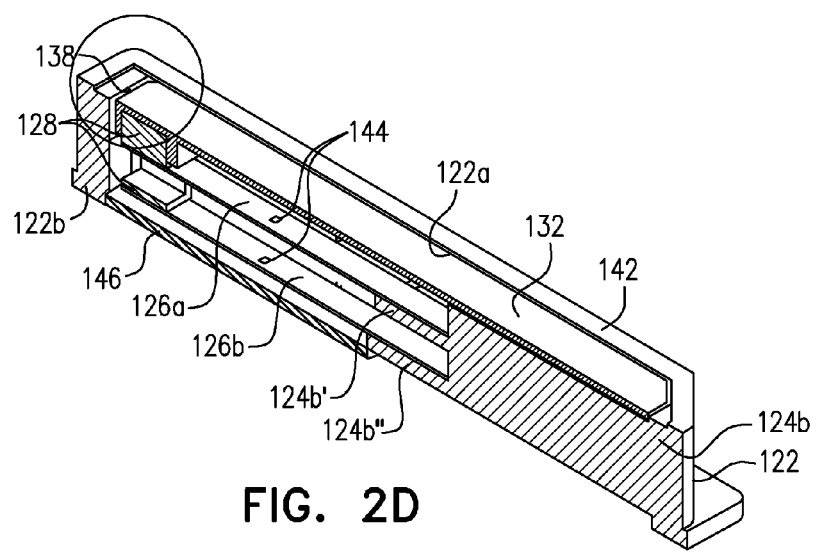

Reference is now made to FIG. 2A, which is a perspective view of a multi-well plate 100 constructed and operative in accordance with an embodiment of the invention, to FIG. 2B, which is an exploded view of the multi-well plate 100 of FIG. 2A, and to FIGS. 2C and 2D, which are perspective sectional views of the multi-well plate 100 of FIGS. 2A and 2B, taken along section lines IIC-IIC and IID-IID in FIG. 2A, respectively.

As shown in FIG. 2A, plate 100 is designed for use with existing equipment and is therefore sized in accordance with standard plate sizes currently in use, with its wells similarly spaced, as defined in ANSI/SBS 1-2004 and in ANSI/SBS 3-2004. As such, when assembled, plate 100 looks similar to a typical 96-well plate, with an upper surface 112, a lower surface 114, and a plurality of sides 116 between surfaces 112 and 114. A plurality of wells 117 are formed in plate 100 and extend between, but not beyond, surfaces 112 and 114. Each well has an aperture 118 formed in upper surface 112, to facilitate the injection of sample fluid into the well.

Turning to FIG. 2B, which is an exploded view of plate 100, it is seen that plate 100 is actually formed of several parts. Sides 116 form part of a frame 122, which has formed on an inner portion thereof, at each lengthwise end of the frame, a pair of supports 124a and 124b, which supports will be explained in more detail in connection with FIGS. 2C and 2D. Each of the supports 124a and 124b has attached thereto a pair of flexible arms 126, consisting of an upper arm 126a and a lower arm 126b, wherein each arm is attached at the proximal end thereof to one of the supports, and is attached the distal end thereof to a block 128. As seen in the enlarged portion of FIG. 2B, each block 128 includes an upper portion and a lower portion, with the arms 126a and 126b being attached to lower surfaces 128a and 128b of the upper and lower portions, respectively. The flexible arms 126 may be made of a material, generally metal or plastic, which is suitably flexible that it will be sensitive to the addition of a few micrograms weight to the wells, as will be explained in more detail below. The arms may be attached to blocks 128 by suitable means, such as adhesive or in some cases melting or welding.

Cylindrical side walls of wells 117 are formed in a well-containing element 130, which may be formed of plastic, glass, or another suitable material. The well containing element 130 includes upper surface 112 and has flanges 132 at longitudinal ends thereof. When plate 100 is assembled, each flange 132 rests on, and optionally is attached to, upper surfaces of upper portions 128*a* of two blocks 128, one block at each end of the flange, and in some embodiments also on supports 124*a* and 124*b* (see FIG. 2D). A bottom piece 134, which is a piece of plastic or glass approximately 170-1000 microns in thickness, is sealingly attached to the underside of well-containing element 130, so as to form the bottom of each well 117 in a manner that seals each well at that end.

In the embodiment shown in FIGS. 2A-2D, the circumference of the uppermost portion of well-containing element 130, including the flanges 132, is slightly less than the inner circumference of frame 122. Consequently, when the flanges 132 of well-containing element 130 rest on blocks 128, there is a small gap 138 between the well-containing element 130 and the frame 122 (see FIG. 2D). The presence of gap 138 allows for movement of the well-containing element 130 along the vertical axis and for concomitant deformation of arms 126, as will be explained below. In order to seal the gap 138 without inhibiting such movement, a very thin (approximately 7 micron) film 140 of a flexible material, such as a suitable plastic, is attached to an upper edge 142 of the frame 122 and to an outer edge of upper surface 112 of well-containing element 130. One way to accomplish such attachment to well-containing element 130 is by having a slightly raised rim 143 around the circumference of the upper edge of element 130, so that film 140 engages the rim 143 and, when also attached to an outer edge of upper surface 112, is disposed above gap 138.

As shown in FIGS. 2A and 2B, film 140 is hollow in the center, so that most of upper surface 112, and particularly the area of surface 112 including wells 117, is exposed and film 140 covers just the edge of well-containing element 130, gap 138, and upper edge 142 of the frame 122. However, it will also be appreciated that in some embodiments, film 140 may be formed to cover the upper edge 142 of frame 122 as well as the entire upper surface 112 of element 130, in which case film 140 will be formed with a plurality of circular openings which would be aligned with apertures 118 in well-containing element 130, to allow user access to wells 117. In such embodiments, well-containing element 130 may be formed with slightly raised portions, or rims, around apertures 118, so as to provide additional surfaces to which film 140 may be affixed.

Film 140, well-containing element 130, bottom piece 134, and frame 122, are attached to each other using any suitable means, such as soldering, adhering, melting, bonding, or any other suitable attachment mechanism.

As noted, when plate 100 is assembled, well-containing element 130 rests on, and is optionally attached at each of its longitudinal ends to, a pair of blocks 128. This restricts the motion of element 130 in the x- and y-directions, but allows for motion in the vertical (z) direction. Thus, when fluid is placed into wells 117 in element 130, the weight of the fluid will result in downward displacement of element 130 and in deformation of arms 126. It will be appreciated that typically not more than several hundred microliters of fluid, and in some applications only a few microliters of fluid, are added to a given well 117. Consequently, the flexible arms 126 should be of suitable flexibility to deflect in response to the addition of micrograms of fluid to the wells.

Reference is additionally made to FIGS. 2C and 2D, which show in greater detail the supports 124*a* and 124*b*, the arms 126 and blocks 128, and the attachment of the arms 126 to the supports. FIG. 2C shows plate 100, as in FIG. 2A, but with a perspective cross-sectional view showing the end of the plate, the cross-sectional view taken along section lines IIC-IIC in FIG. 2A. FIG. 2D shows the same plate, with an enlarged cross-sectional view taken from the same angle as FIG. 2C along section lines IID-IID in FIG. 2A, which cross-sectional view shows the other end of plate. FIG. 2C shows the pair of arms 126 closest to the end of the plate, whereas FIG. 2D shows the pair of arms 126 disposed slightly inward from the end of the plate.

Support 124*a* protrudes from both the inner wall 122*a* which is located at one longitudinal end of frame 122, as well as from the longitudinal wall 122*b* adjacent thereto. Support 124*b* protrudes from the opposite longitudinal wall 122*c* and is spaced from the inner wall 122*a* by the width of support 124*a*. Supports 124*a* and 124*b* project in opposite directions from the longitudinal walls, each of supports 124*a* and 124*b* projecting about one third of the way between the longitudinal walls, with each support having a pair of tongues (shown in FIG. 2D for support 124*b* as 124*b*' and 124*b*") that project further until approximately midway between the two longitudinal walls. The distance between the upper faces of the tongues is equal to the distance between the arms 126*a* and 126*b*. One pair of arms is attached at its proximal end to support tongues 124*a*' and 124*a*" (not shown) of support 124*a* and the other pair of arms is attached at its proximal end to tongues 124*b*' and 124*b*" of support 124*b*. Each pair of arms is attached at its distal end to a block 128. As noted, element 130 is placed so as to rest upon and be attached to blocks 128. If this is position is considered the neutral or ground position, arms 126 are constructed so as to have sufficient flexibility in the z-axis to deform from this neutral position upon the addition of liquid to some of wells 117.

Attached to the upper and lower surfaces of each arm 126, in the free region of the arm but, in some embodiments, near the point at which the arm is attached to frame 122, there is a thin, flat strain gauge 144. Each of the strain gauges is electrically connected (e.g. by thin wires, not shown) to a thin, flat electronic card 146 located below the lower arms 126*b*. Preferably, electronic cards 146 are positioned so as to minimize the length of the connections between the strain gauges 144 and the cards 146. Cards 146 are electrically coupled to a processor (not shown). It will be appreciated that use of strain gauges 144 and cards 146 allows for correlation of the deflection of the arms 126 to the change in electrical resistance in a circuit, for example measured using a Wheatstone Bridge, which is also located on card 146, allowing calculation of the mass of the fluid added to the wells. As such, arms 126 together with strain gauges 144 form a signal provider, for providing a signal indicative of a change in the amount of fluid in one or more of the wells. If the density of the fluid is known, this facilitates computation of the volume of fluid added. In some embodiments, plate 100 further includes a power supply (not shown) such as a rechargeable battery, for example connected to electronic card 146, which power supply provides power to electronic components of plate 100 and may be recharged when plate 100 is connected to a power source or computation device via a suitable port (not shown).

For example, if rows A through L of plate 100 are filled sequentially using an 8-tip pipette, it is possible to iteratively calculate the amount of fluid added to each row, and therefore to identify in real time, on a row-by-row basis, when an incorrect amount of fluid has been added to the row. This allows that particular row to be discarded from the calculations at the end of the experiment, rather than discarding the results for the entire plate. Preferably, the apparatus used to add fluid to the wells will be equipped with control software to allow the affected row only to be excluded from further manipulations during the remainder of the experiment, such as the addition of reagents and reactants. It will also be appreciated that even if all the wells are filled simultaneously, the use of plate 100 in conjunction with appropriate software to identify in real time the addition of an incorrect amount of fluid to the plate enables the user to stop running experiments using that particular plate, thus avoiding waste of reagents, reactants and the like in downstream experiments.

In accordance with some embodiments of the invention, plate 100 includes means for heating and, optionally, cooling individual wells. Such heating means may take the form of, for example, (a) a heating coil disposed around at least a portion of the well, or (b) a Peltier device, sometimes called a Peltier heat pump or thermoelectric cooler. As will be appreciated, a Peltier device can be used to cool as well as to heat an individual well, as well as to sense or monitor the temperature in the well or in the vicinity thereof. In this way, the temperature in individual wells may be controlled, for example the temperature in each well may be maintained at 37° C.±0.5° C.

In one embodiment, a single heating coil or Peltier device may be disposed on the well-containing element 130 for collectively heating two or more wells 117. In another embodiment, heating coils or Peltier devices may be disposed on one or more individual wells 117 for heating thereof.

It will also be appreciated that if the temperature of the wells is periodically measured, and if the device used to measure the temperature is coupled to a controller that controls the heating means for each individual well, then the individual well heating means, used in conjunction with the periodic measuring of temperature in individual wells, can provide a way to improve control over the conditions in a given well. Thus, for example, plates 100 having such heating means may be stored in an incubator and the temperature of the wells monitored periodically and the temperature of individual wells adjusted, if necessary, by heating (or cooling) individual wells. Alternatively, the heating means may themselves be used to effect incubation, for example temperature monitoring and adjustment may be effected frequently, say for example every 15, 10 or 5 minutes, to maintain the temperature in particular wells at e.g. 37° C.±0.5° C. so as to effect incubation. Thus, by equipping the plate 100, the well-containing element 130, or the wells 117 with individual heating elements for each well, in cases in which it is found that the temperature is incorrect, the temperature may be adjusted and controlled.

It will be appreciated that since reagents and other fluids may be added into or removed from wells 117 in well-containing element 130 which may be removed from plate 100 and optionally disposed of, plate 100 may be used multiple times and/or for multiple experiments, provided that well-containing element 130 are replaced between each use of the plate 100.

Figure 3A:
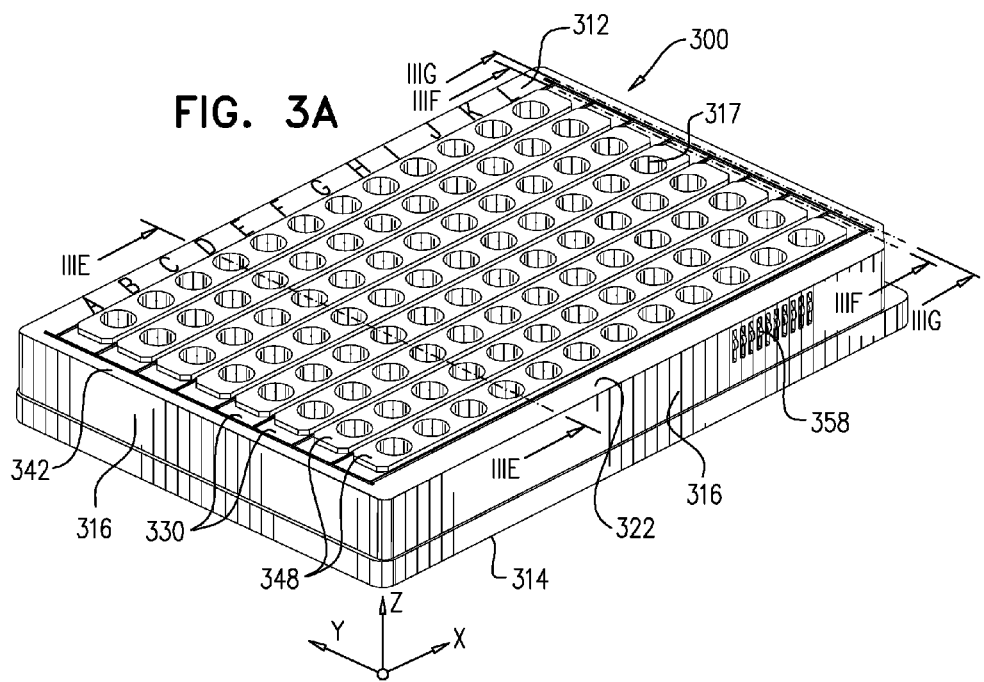
FIGS. 3A and 3B are perspective views of a multi-well plate constructed and operative in accordance with another embodiment of the invention.
Figure 3B:
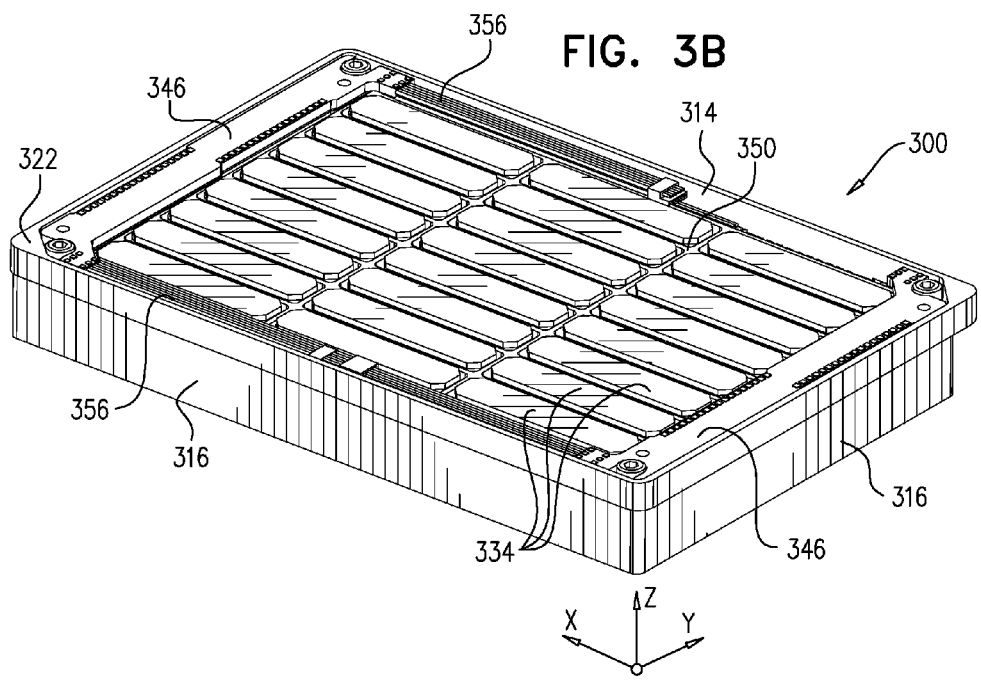
Figure 3D:
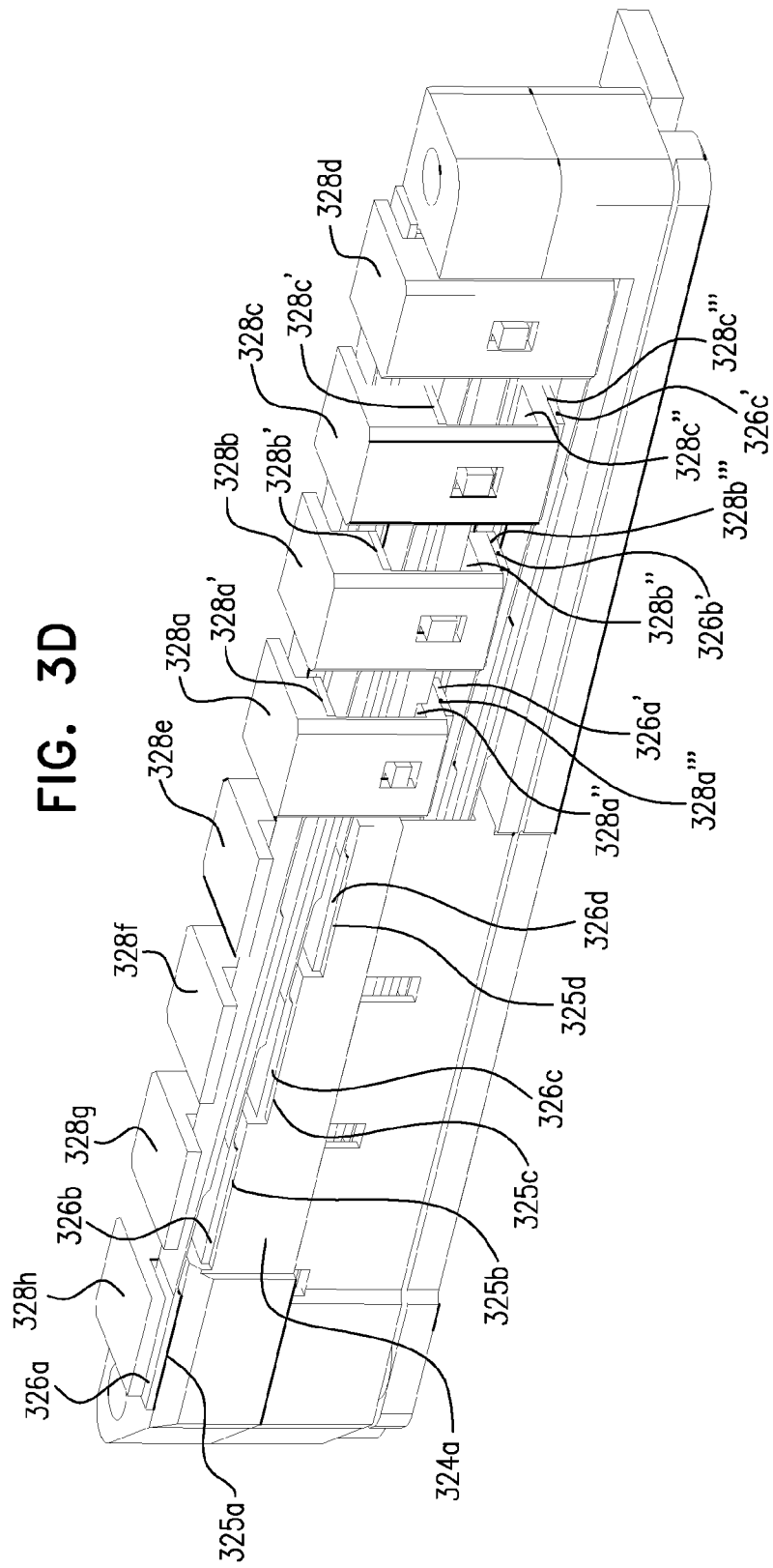
FIG. 3D is an enlarged perspective view of supports, arms, and blocks forming part of the multi-well plate of FIGS. 3A and 3B.
Figure 3F:
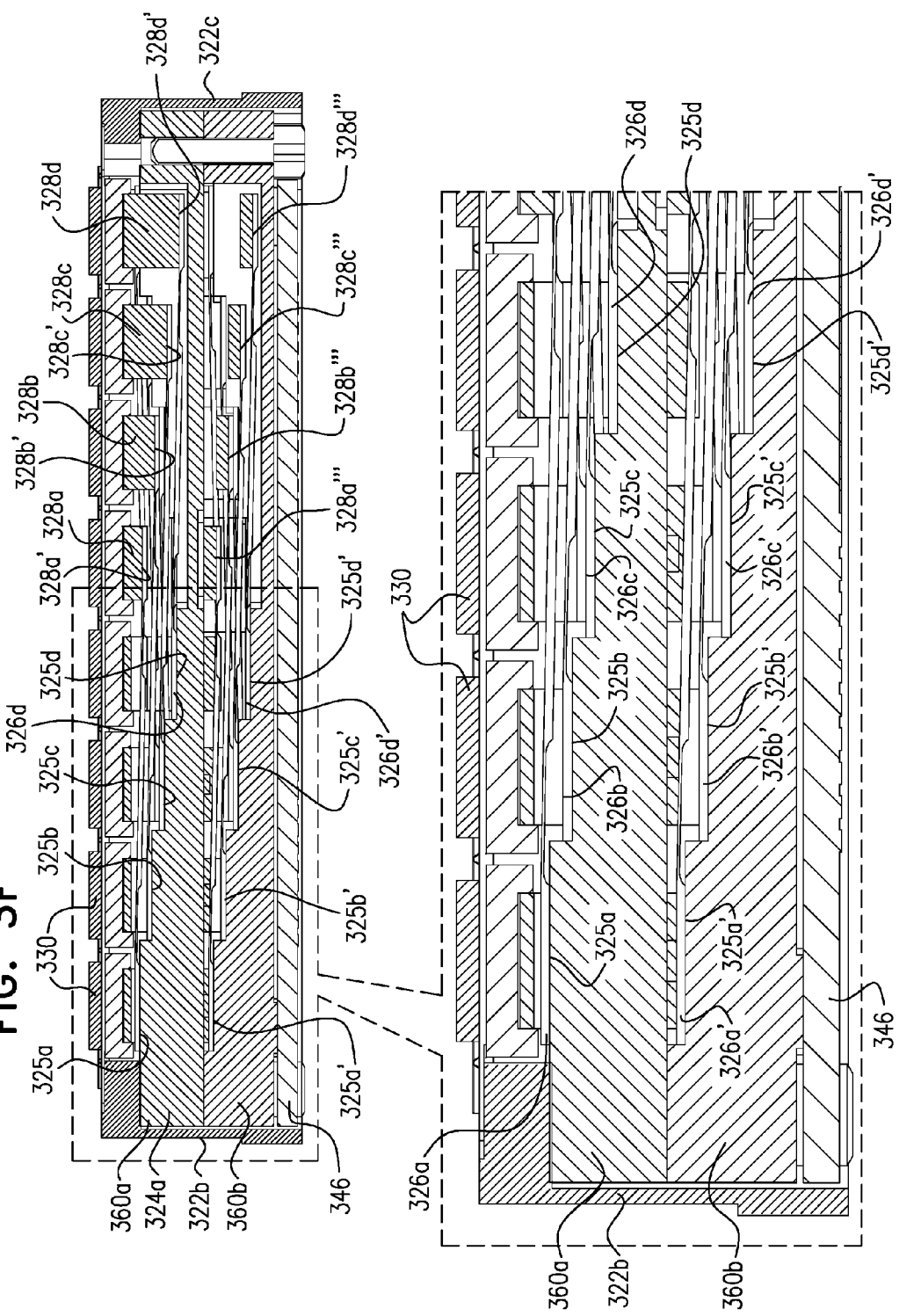
Figure 3G:
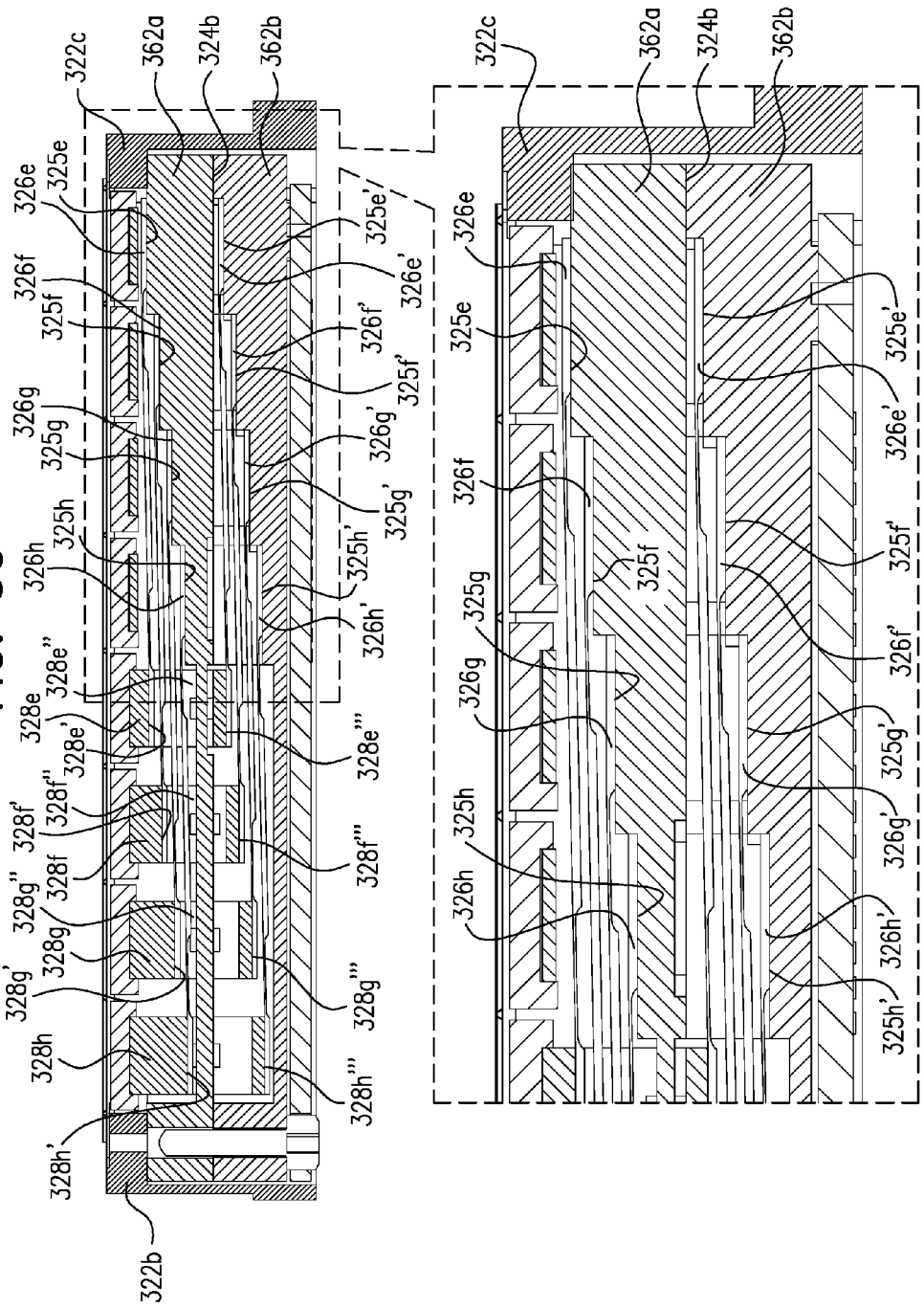

Reference is now made to FIGS. 3A to 3G, which show a multi-well plate 300 and components thereof, constructed and operative in accordance with embodiments of the invention. Specifically, FIGS. 3A and 3B are perspective views of multi-well plate 300, FIG. 3C is an exploded view of the multi-well plate 300, FIG. 3D is an enlarged perspective view of supports, arms, and blocks forming part of the multi-well plate 300, and FIGS. 3E, 3F, and 3G are sectional views of the multi-well plate 300 taken along section lines IIIE-IIIE, IIIF-IIIF, and IIIG-IIIG in FIG. 3A.

As shown in FIGS. 3A and 3B, plate 300 is designed for use with existing equipment and is therefore sized in accordance with standard plate sizes currently in use, with its wells similarly spaced. Thus, when assembled, plate 300 looks similar to a typical 96-well plate, with an upper surface 312, a lower surface 314, a plurality of sides 316 between surfaces 312 and 314, and having a plurality of wells 317 formed therein, extending between, but not beyond, surfaces 312 and 314.

As shown in FIG. 3C, which is an exploded view of plate 300, plate 300 is actually formed of several parts. Sides 316 are part of a frame 322, which has formed on an inner portion thereof, at the lengthwise ends of the frame, a pair of supports 324a and 324b each including a plurality of "stairs" 325, which supports will be explained in more detail in connection with FIGS. 3D, 3F, and 3G. Frame 322 includes end walls 322a and 322d disposed at longitudinal ends of the frame, as well as longitudinal walls 322b and 322c.

Each of the supports 324a and 324b has attached thereto multiple flexible arms 326, wherein each arm is attached at the proximal end thereof to one of the supports, and is attached the distal end thereof to a block 328. The structure and functionality of flexible arms 326 and of blocks 328 will be described in further detail hereinbelow with reference to FIGS. 3D, 3F, and 3G. The flexible arms 326 may be made of a suitable material, generally metal or plastic, which is suitably flexible as to be sensitive to the addition or removal of a small volume to or from the wells, as will be explained in more detail below. For example, flexible arms 326 would be sensitive to the addition to the wells of less than 300 microliters (µl), less than 250 µl, less than 200 µl, less than 150 µl, less than 100 µl, less than 75 µl, less than 50 µl, less than 45 µl, less than 40 µl, less than 35 µl, less than 30 µl, less than 25 µl, less than 20 µl, less than 15 µl, less than 10 µl, less than 5 µl, less than 4 µl, less than 3 µl, less than 2 µl, or less than 1 µl. The arms 326 may be attached to blocks 328 by suitable means, such as adhesive or in some cases melting or welding.

Plate 300 further includes eight identical well-supporting elements 330, each including a longitudinal aperture 333 suited to receive a well-containing element 348 therein. Each well-containing element 348 has twelve cylinders 320, forming side walls of tubular wells 317, formed therein. Each of elements 330 also has a pair of flanges 332, one flange at each of the longitudinal ends thereof. Well-supporting elements 330 may be formed of plastic or another suitable material and may contain other materials such as glass. When assembled, each flange 332 rests on, and preferably is attached to, two blocks 328, one block per flange; the manner in which blocks 328 are held in place relative to frame 322 will be discussed in more detail below.

A plurality of bottom pieces 334, which are pieces of plastic or glass approximately 170-1000 microns in thickness, are sealingly attached to the undersides of well-containing elements 348, so as to form the bottom of each well 317 in a manner that seals each well at that end of the well. In the illustrated embodiment, three pieces 334, each sealing four wells 317, are attached to each well containing element 348. That said, any suitable arrangement or number of bottom pieces may be used, e.g. all the wells in a single well containing element 348 may be sealed with a single piece 334, each well 317 may be sealed with an individual bottom piece 334, or six bottom pieces 334 may be used to seal pairs of wells 317 in a single well containing element 348. In some embodiments, frame 322 includes, adjacent a bottom portion thereof, partitions 350 which divide the frame into sections 352, each section 352 being suitably sized to fit one of bottom pieces 334, and the wells 317 attached thereto.

It will be appreciated that when assembled together, the circumference of the uppermost portion of the collection of well-supporting elements 330, including the flanges 332, is slightly less than the inner circumference of frame 322, so that when the flanges 332 of well-supporting elements 330 rest on blocks 328, there is a small gap 338 between the well-supporting elements 330 and the frame 322 (see FIG. 3E), as well as between elements 330 themselves (see FIG. 3E). The presence of gaps 338 allows for movement of the well-supporting elements 330 along the vertical axis and for concomitant deformation of arms 326, as will be explained below. In order to seal the gaps 338 without inhibiting such movement, a very thin (for example, approximately 7 micron) film 340 of a flexible material, such as a suitable plastic, is attached to an upper edge 342 of the frame 322 and to at least a portion of the upper surface of well-supporting elements 330. Film 340 includes eight rectangular openings 343 which are aligned with the apertures 333 in the assembled well-supporting elements 330.

Film 340, well supporting elements 330, bottom pieces 334, and frame 322, are attached to each other using any suitable means, such as soldering, adhering, melting, bonding, or any other suitable attachment mechanism. It will be appreciated that in the embodiment shown, well-containing elements 348 may be easily removed from well supporting elements 330, without damaging the sensitive structure and functionality of arms 326, which is described in further detail hereinbelow.

As noted, when plate 300 is assembled, well-supporting elements 330 rest on, and are attached at each of their longitudinal ends to, a pair of blocks 328. This restricts the motion of elements 330 in the lateral and longitudinal (x- and y-) directions, but allows for motion in the vertical (z-) direction. Thus, when fluid is placed into (or removed from) a well in a well containing element 348 located in any of well supporting elements 330, the increase (or decrease) in the weight of the fluid will result in the deformation of arms 326 attached to that well supporting element 330. It will be appreciated that typically not more than several hundred microliters, and in some applications only a few microliters or less, are added to a given well 317. Consequently, the flexible arms 326 should be of suitable flexibility to deflect in response to the addition (or removal) of such quantities of fluid (or the equivalent masses) to (or from) the wells. For example, less than 300 microliters ($\mu l$), less than 250 $\mu l$, less than 200 $\mu l$, less than 15 $\mu l$, less than 100 $\mu l$, less than 75 $\mu l$, less than 50 $\mu l$, less than 45 $\mu l$, less than 40 $\mu l$, less than 35 $\mu l$, less than 30 $\mu l$, less than 25 $\mu l$, less than 20 $\mu l$, less than 15 $\mu l$, less than 10 $\mu l$, less than 5 $\mu l$, less than 4 $\mu l$, less than 3 $\mu l$, less than 2 $\mu l$, or less than 1 $\mu l$ of fluid may be added to a well 317 at any given time.

Attached to the upper and lower face of each arm 326 near the point at which the arm is attached to one of "stairs" 325 (which will themselves be described in more detail below) is a thin, flat strain gauge 344. It will be appreciated that alternatively, rather than place a strain gauge on the upper face and one on the lower face an arm, two strain gauges may be placed on the upper face of an arm, one near where the arm is attached to frame 322 and the other near where the arm is attached to block 328, or two strain gauges may be placed on the lower face of an arm only, one near where the arm is attached to frame 322 and the other near where the arm is attached to block 328.

Each strain gauge 344 is electrically coupled (e.g. by thin wires, not shown) to a thin, flat electronic card 346 located below lower arms 326. Preferably, electronic cards 346 are positioned so as to minimize the length of the connections between the strain gauges 344 and the cards. Cards 346 are electrically coupled, via a plurality of wires 356, to a port 358 located on frame 322, which port is configured for connection to an electrical port of a suitably equipped plate base and data reader, as described hereinbelow with reference to FIGS. 8 to 9B.

In some embodiments, the data reader may run a graphical user interface as described hereinbelow with reference to FIGS. 5A to 7. Preferably, port 358 does not extend beyond, and preferably is flush with, the outer surface of frame 322, and does not affect the overall dimensions of plate 300, thus allowing use of standard equipment. In some embodiments, plate 300 further includes a power supply (not shown) such as a rechargeable battery, for example connected to electronic card 346, which power supply provides power to electronic components of plate 300 and may be recharged when plate 300 is connected to a power source or computation device via port 358 or a USB port.

Electronic cards 346 may have located thereon an element for measuring electrical resistance in a circuit, such as a Wheatstone Bridge. The deflection of the arms 326 caused by a change of the volume, or weight, contained in one or more of wells 317, leads to a change in the length of the resistors in corresponding strain gauges 344. This change in strain gauges 344 is correlated to the change in electrical resistance in a circuit, which change is measured by the elements on electronic cards 346, using e.g. a Wheatstone Bridge. The change in the electrical resistance in the circuit allows for calculation of the mass of the fluid added to (or removed from) the wells 317. Specifically, a greater mass of fluid added to (or removed from) the wells, results in a greater change in the deflection of arms 326, which in turn leads to a greater change in the electrical resistance in the circuit. Thus, measurement of changes in the electrical resistance in the circuit, is indicative of, and allows for calculation of the change in the mass of fluid in the wells. If the density of the fluid is known, this facilitates computation of the volume of fluid added (or removed). As such, arms 326 together with strain gauges 344 form signal providers, for providing signals indicative of a change in the amount of fluid in one or more of the wells.

For example, if columns A through L of plate 300 are filled sequentially using an 8-tip dispenser, it is possible to iteratively calculate the amount of fluid added to each well in each column, and thereby to identify in real time, on a well-by-well basis, when an incorrect amount of fluid, either too much or too little, has been added to a particular well. Preferably, the apparatus used to add fluid to the wells will be equipped with control software that will allow the apparatus used to correct for the error. In the case in which too little fluid has been added, additional fluid may be dispensed to the affected well so as to reach the correct amount of fluid in the well, and/or the software may be able to adjust for the error by adding proportionately less reagent or reactant liquid to the affected well in later manipulations. Similarly, if too much fluid has been added to a particular well, the addition of reagents or reactants in further manipulations may be scaled up appropriately.

Alternately, the affected well, or well-containing element, may be included in further manipulations during the remainder of the experiment, and the results of the particular well may be used in the calculations at the end of the experiment by adjusting the calculations to account for the incorrect volume used while conducting the experiment.

As a further alternative, identification of a particular well as having had an incorrect amount of fluid added thereto allows that particular well to be discarded from the calculations at the end of the experiment, rather than discarding the results for the entire row or column in which the well is located, or for the entire plate.

It will also be appreciated that even if all the wells are filled simultaneously, the use of plate 300 in conjunction with appropriate software to identify in real time the addition of an incorrect amount of fluid to a specific well supporting element 330, enables the user to stop running experiments using wells in that particular element 330 or in the plate 300, thus avoiding waste of reagents, reactants and the like in downstream experiments.

Additionally, electronics cards 346 may have electrically coupled thereto components for manipulating data collected by the various sensor elements coupled to the cards, such as an analog-to-digital converting component for converting the analog signals of the Wheatstone Bridge to digital signals, and normalizing components for normalizing the collected signals.

In some embodiments, plate 300 also includes one or more temperature sensors (not shown), electrically coupled to electronics cards 346, and configured to provide an indication of the temperature, or of a temperature change, in the vicinity of one or more of wells 317. It is appreciated that a temperature change in the system may affect the strain gauges 344, and therefore knowledge of and computational consideration of changes to the temperature can allow for more accurate identification of the weight in a well and for ensuring a stable temperature of the sample in the well, which may be sensitive to temperature changes.

In accordance with some embodiments of the invention, plate 300 includes means for heating and, optionally, cooling individual wells. Such heating means may take the form of, for example, (a) a heating coil disposed around at least a portion of the well, or (b) a Peltier device, sometimes called a Peltier heat pump or thermoelectric cooler. As will be appreciated, a Peltier device can be used to cool as well as to heat an individual well, as well as to sense or monitor the temperature in the well or in the vicinity thereof. In this way, the temperature in individual wells may be controlled, for example the temperature in each well may be maintained at 37° C.±0.5° C.

In some embodiments, a heating coil or Peltier device may be disposed on some or all of the well-supporting elements 330, for collectively heating two or more the wells supported by that well-supporting element. In other embodiments, heating coils or Peltier devices may be disposed on some or all of the individual wells 317, for example on cylinders 320 thereof, such that each heating coil or Peltier device heats a specific well 317 on or in which it is disposed.

It will also be appreciated that if the temperature of the wells is periodically measured, and if the device used to measure the temperature is coupled to a controller that controls the heating means for each individual well, then the individual well heating means, used in conjunction with the periodic measuring of temperature in individual wells, can provide a way to improve control over the conditions in a given well. Thus, for example, plates 300 having such heating means may be stored in an incubator and the temperature of the wells monitored periodically and the temperature of individual wells adjusted, if necessary, by heating (or cooling) individual wells. Alternatively, the heating means may themselves be used to effect incubation, for example temperature monitoring and adjustment may be effected frequently, say for example every 15, 10 or 5 minutes, to maintain the temperature in particular wells at e.g. 37° C.±0.5° C. so as to effect incubation. Thus, by equipping the plate 300, the well-supporting elements 330, or the wells 317 with individual heating elements for each well, in cases in which it is found that the temperature is incorrect, the temperature may be adjusted and controlled.

Reference is now made to FIG. 3D, which is an enlarged perspective view of the supports 324a and 324b, including arms 326 and blocks 328, and to FIGS. 3F and 3G, which are sectional illustrations taken along section lines IIIF-IIIF and IIIG-IIIG respectively in FIG. 3A. FIGS. 3D, 3F, and 3G show in greater detail the supports 324a and 324b, the arms 326, the blocks 328, and the attachment of the arms 326 to the supports.

As seen, eight blocks 328 are located near each longitudinal end of frame 322, so that each well supporting element 330 rests on and is attached to two blocks 328, one at each longitudinal end of element 330. In order to accommodate eight blocks at each end of the frame 322, the supports 324a and 324b and the blocks 328 are designed in a step-stair fashion, as described hereinbelow. A first support 324a protrudes from the inner wall 322d of one longitudinal end of frame 322 as well as from the longitudinal wall 322b adjacent thereto. At the other longitudinal end of frame 322, a second support 324a protrudes from longitudinal wall 322b but is spaced slightly from the inner wall 322a. In both cases, in order to accommodate four pairs of arms 326 and to facilitate appropriate positioning of the blocks 328, support 324a is constructed in stair-step fashion, having two sets of "stairs", an upper set 360a and a lower set 360b, formed in parallel. All of the "stairs" of support 324a protrude from inner wall 322b of frame 322, but whereas all of the "stairs" have the same width along the longitudinal axis of frame 322, the uppermost "stairs" of each set, 325a and 325a', protrude the least from inner wall 322b, "stairs" 325b and 325b' protrude slightly more, "stairs" 325c and 325c' protrude more, and "stairs" 325d and 325d' protrude to about halfway between wall 322b and wall 322c.

The distance between the upper surfaces of each pair of corresponding "stairs" (i.e. between 325a and 325a', between 325b and 325b', between 325c and 325c', and between 325d and 325d') is the same as the distance between the lower surfaces of each pair of arms. A first pair of arms 326a and 326a' is thus attached at the proximal ends thereof to "stairs" 325a and 325a', a second pair of arms 326b and 326b' is attached at the proximal ends thereof to "stairs" 325b and 325b', a third pair of arms 326c and 326c' is attached at the proximal ends thereof to "stairs" 325c and 325c' and a fourth pair of arms 326d and 326d' is attached at the proximal ends thereof to "stairs" 325d and 325d'. The "stairs" are spaced from each other such that the arms in each pair of arms are parallel to one another, and so that in the course of normal use, each pair of arms may move without contacting another pair of arms.

As seen in FIGS. 3D and 3F, at their distal ends, the arms 326 are attached to blocks 328, such that each pair of arms is attached in parallel to a single block 328. In order to facilitate a compact arrangement of the arms, each block 328 comprises an upper inner surface for attachment of a first arm thereto, a lower inner surface for attachment of a second arm thereto, and a recess allowing the additional arms to pass therethrough. Thus, arm 326a attached to stair 325a is attached to an upper inner face 328a' of block 328a which is closest to the center of the frame, and block 328a is constructed with a recess 328a" in order to allow arms 326b, 326c and 326d to pass therethrough without touching each other and without touching block 328a. Similarly, arm 326a' attached to stair 325a' is attached at its distal end to the bottommost surface 328a''' of block 328a, with arms 326b', 326c' and 326d' passing thereunder in parallel to one another. Block 328b is similarly constructed, to allow for attachment of arms 326b and 326b' at surfaces 328b' and 328b''' respectively and to allow passage therethrough of arms 326c and 326d and passage of arms 326c' and 326d' thereunder. Block 328c is constructed to allow for attachment of arms 326c and 326c' at surfaces 328c' and 328c''' and to allow passage therethrough of arm 326d and passage of arm 326d' thereunder. Block 328d, which of the four blocks 328a, 328b, 328c and 328d is closest to wall 322c, is constructed to allow attachment of arms 326d and 326d' at surfaces 328d' and 328d''' respectively. It will be appreciated that as a result of this construction, the sizes of the upper portion of blocks 328a, 328b, 328c and 328d differ from one another. It will also be appreciated that each of blocks 328a, 328b, 328c and 328d are of different overall height, and while it is preferable that the location of the uppermost surface of each block, relative to the top of the frame 322, be the same, there can be slight differences in the location of the uppermost surface of each block, as the software used to calculate the displacement and thus the mass of fluid added to the wells can be programmed to account for such differences. For the same reason, it is not necessary that all the blocks 328 have the same mass.

As seen clearly in FIG. 3G, support 324b is arranged in an analogous manner to that of support 324a, in the opposite direction. At one longitudinal end of the frame 322, a first support 324b protrudes from the inner wall 322a of one longitudinal end of frame 322 as well as from the longitudinal wall 322c adjacent thereto. At the other longitudinal end of frame 322, a second support 324b protrudes from longitudinal wall 322c but is spaced slightly from inner wall 322d. Near wall 322d, support 324b is spaced therefrom so as to accommodate arms 326a, 326a', 326b, 326b', 326c, 326c', 326d and 326d'. In order to accommodate four pairs of arms 326 and to facilitate appropriate positioning of the blocks 328, support 324b is constructed in stair-step fashion, having two sets of "stairs", an upper set 362a and a lower set 362b, formed in parallel. All of the "stairs" of support 324b protrude from inner walls 322a (or 322d) and 322c of frame 322, but whereas all of the "stairs" have the same width and thus project the same distance from wall 322a (or 322d), the uppermost "stairs" of each set, 325e and 325e', protrude the least from inner wall 322c, "stairs" 325f and 325f' protrude slightly more, "stairs" 325g and 325g' protrude more, and "stairs" 325h and 325h' protrude to about halfway between wall 322c and wall 322b.

The distance between the upper surfaces of each pair of corresponding "stairs" (i.e. between 325e and 325e', between 325f and 325f', between 325g and 325g', and between 325h and 325h') is the same as the distance between the lower surfaces of each pair of arms. A first pair of arms 326e and 326e' is thus attached at the proximal ends thereof to "stairs" 325e and 325e', a second pair of arms 326f and 326f' is attached at the proximal ends thereof to "stairs" 325f and 325f', a third pair of arms 326g and 326g' is attached at the proximal ends thereof to "stairs" 325g and 325g' and a fourth pair of arms 326h and 326h' is attached at the proximal ends thereof to "stairs" 325h and 325h'. The "stairs" are spaced from each other such that the arms in each pair of arms are parallel to one another, and so that in the course of normal use, each pair of arms may move without contacting another pair of arms.

As seen in FIGS. 3D and 3G, at their distal ends, the arms 326 are attached to blocks 328, each pair of arms being attached in parallel to a single block 328. In order to facilitate a compact arrangement of the arms, each block 328 comprises an upper inner surface for attachment of a first arm thereto, a lower inner surface for attachment of a second arm thereto, and a recess allowing the additional arms to pass therethrough. Thus, arm 326e attached to stair 325e is attached to an upper inner face 328e' of block 328e which is closest to the center of the frame, and block 328e is constructed with a recess 328e'' in order to allow arms 326f, 326g and 326h to pass therethrough without touching each other and without touching block 328e. Similarly, arm 326e' attached to stair 325e' is attached at its distal end to the bottommost surface 328e''' of block 328e, with arms 326f', 326g' and 326h' passing thereunder in parallel to one another. Block 328f is similarly constructed, to allow for attachment of arms 326f and 326f' at surfaces 328f' and 328f''' respectively and to allow passage therethrough of arms 326g and 326h and passage of arms 326g' and 326h' thereunder. Block 328g is constructed to allow for attachment of arms 326g and 326g' at surfaces 328g' and 328g''' and to allow passage therethrough of arm 326h and passage of arm 326h' thereunder. Block 328h, which of the four blocks 328e, 328f, 328g and 328h is closest to wall 322b, is constructed to allow attachment of arms 326h and 326h' at surfaces 328h' and 328h''' respectively.

It will be appreciated that as a result of this construction, the sizes of the upper portion of blocks 328e, 328f, 328g and 328h differ from one another. It will also be appreciated that each of blocks 328e, 328f, 328g and 328h are of different overall height, and while it is preferable that the location of the uppermost surface of each block, relative to the top of the frame 322, be the same, there can be slight differences in the location of the uppermost surface of each block, as the software used to calculate the displacement and thus the mass of fluid added to the wells can be programmed to account for such differences. For the same reason, it is not necessary that all the blocks 328 have the same mass.

It will be appreciated that since reagents and other fluids are added into or removed from wells 317 in well-containing elements 348, which are removable from plate 300, plate 300 may in principle be used multiple times and/or for multiple experiments, provided that well-containing elements 348 are replaced between each use of the plate 300.

Figure 4A:
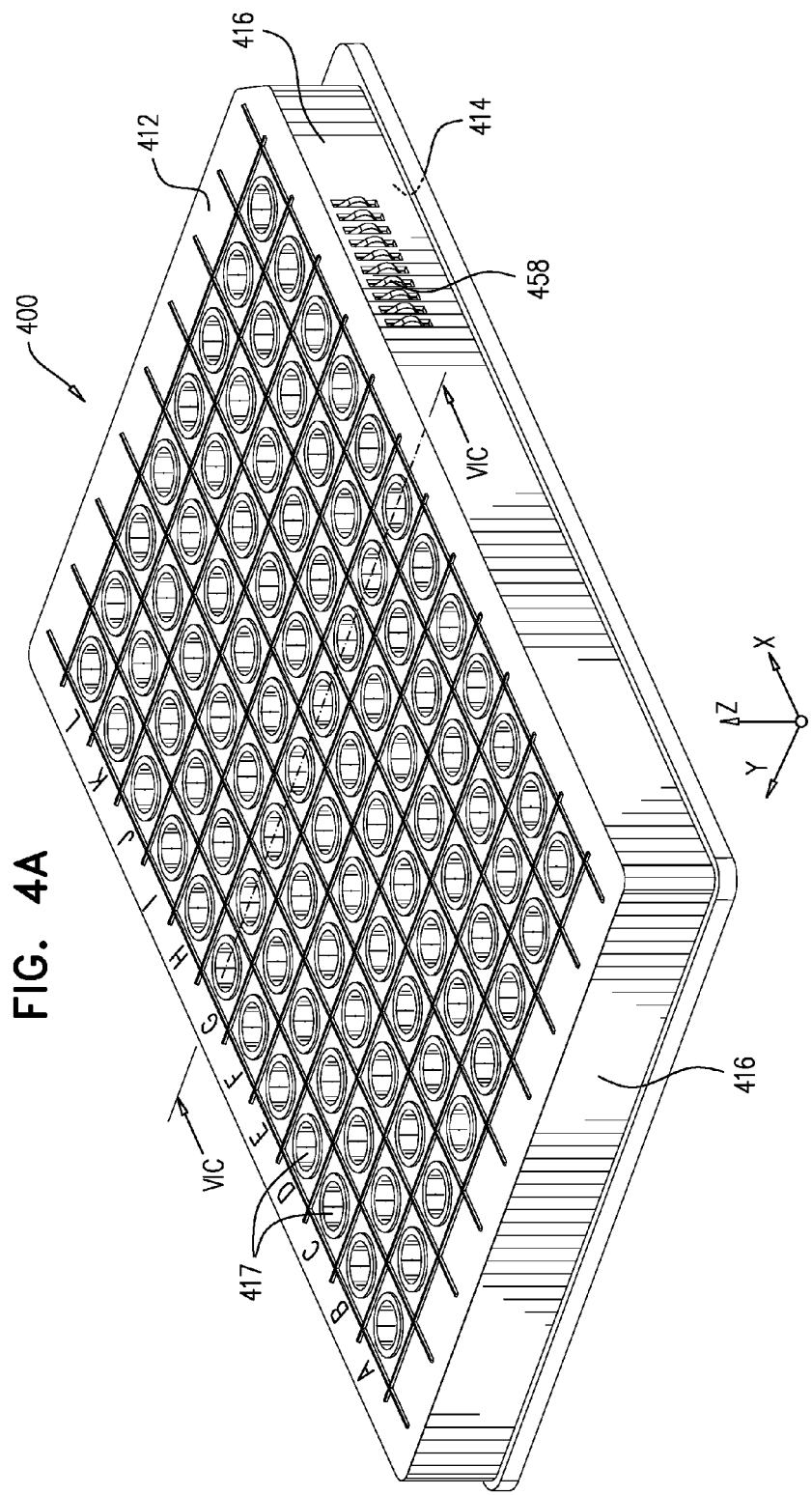
FIG. 4A is a perspective view of a multi-well plate constructed and operative in accordance with yet another embodiment of the invention.
Figure 4B:
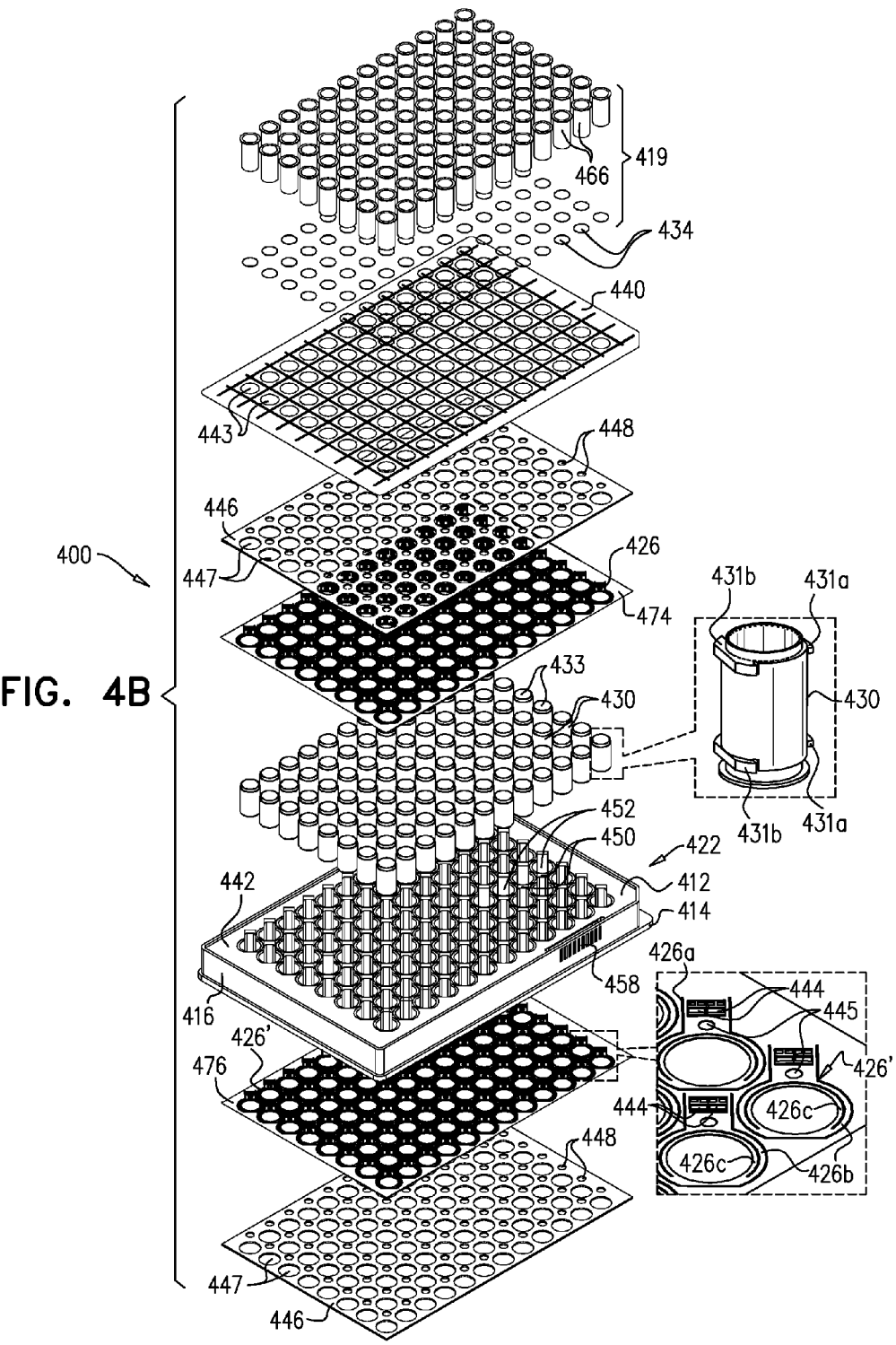
FIG. 4B is an exploded view of the multi-well plate of FIG. 4A.
Figure 4C:
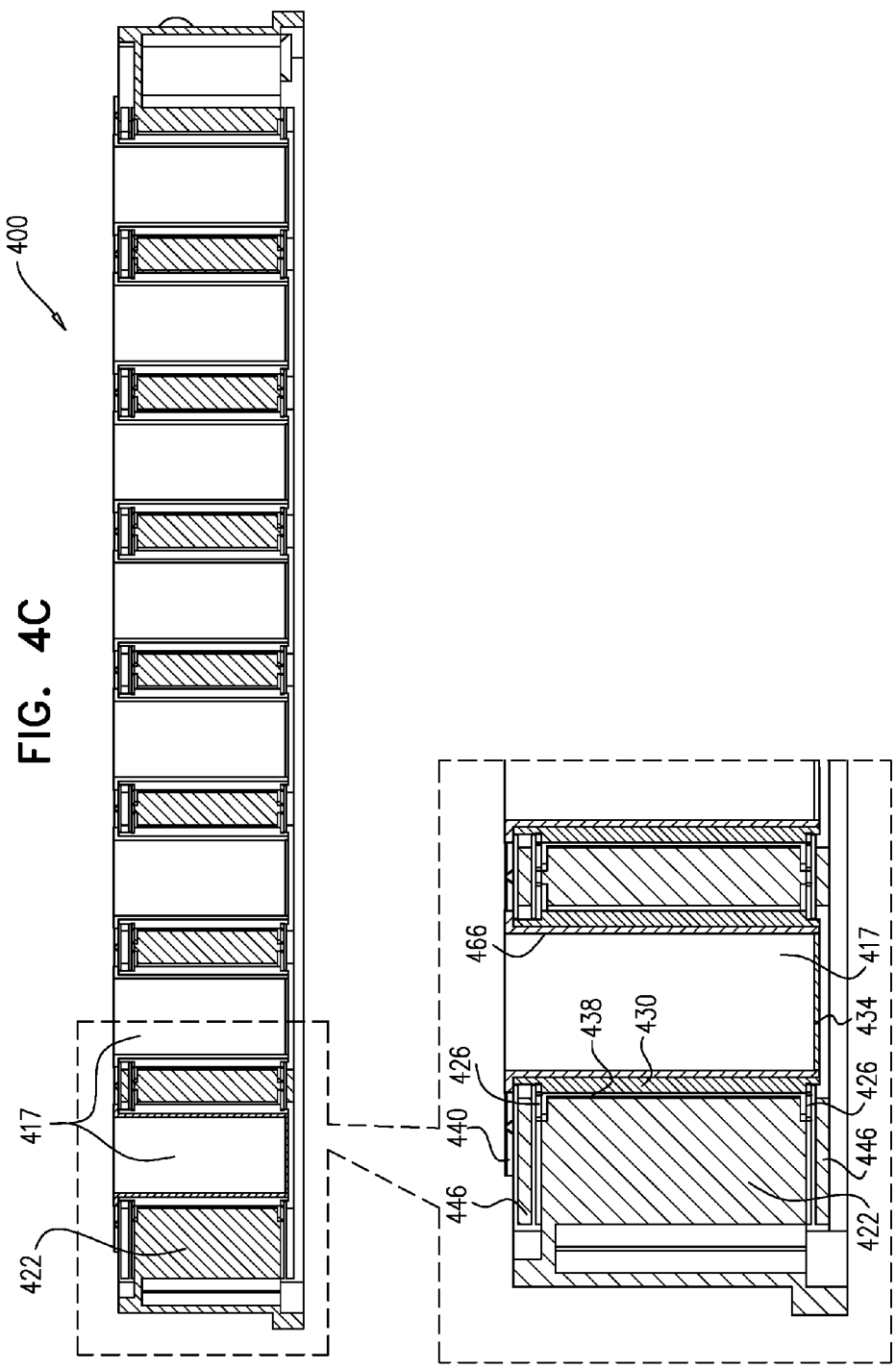
FIG. 4C is a sectional view of the multi-well plate of FIGS. 4A and 4B, taken along section lines IVC-IVC in FIG. 4A.

Reference is now made to FIGS. 4A-4C, which show a multi-well plate 400 and components thereof, constructed and operative in accordance with embodiments of the teachings herein. Specifically, FIG. 4A is a perspective view of the multi-well plate 400, FIG. 4B is an exploded view of the multi-well plate 400, and FIG. 4C is a sectional view of the multi-well plate 400, taken along section lines IVC-IVC in FIG. 4A.

As seen in FIG. 4A, when assembled, plate 400 looks generally similar to plate 300 of FIGS. 3A-3G. However, it will also be apparent from FIG. 4B and from the description herein that although the purposes and uses of plates 300 and 400 are similar, the construction of plate 400 is somewhat different from that of plate 300.

Plate 400 is designed for use with existing equipment and is therefore sized in accordance with standard plate sizes currently in use, with its wells similarly spaced; thus when assembled, plate 400 looks similar to a typical 96-well plate, with an upper surface 412, a lower surface 414, a plurality of sides 416 between surfaces 412 and 414, and having a plurality of wells 417 formed therein, extending between, but not beyond, surfaces 412 and 414.

As shown in FIG. 4B, which is an exploded view of plate 400, plate 400 is actually formed of several parts. Sides 416 are part of a frame 422, which also includes a well-defining skeleton 450, which defines 96 bores 452 in frame 422, each bore having a generally circular cross section along the horizontal plane, and a generally rectangular cross section along the vertical plane.

Plate 400 further includes 96 individual identical cylindrical well supporting elements 430, each including an aperture 433, each sized to fit in one of bores 452 and suited to receive a single well-defining element 419, which may be easily removed from a well supporting element 430 in which it is accommodated. Each individual well 417 is defined in by well-defining element 419 which is formed of a cylindrical portion 466 and is sealed at its bottom with a generally circular bottom piece 434.

Each well-supporting element 430 is adhered to, or otherwise attached to, two arms 426 and 426' located in plates 474 and 476, respectively. Arms 426 and 426' may be, but are not necessarily, formed integrally in plates 474 and 476. For ease of reference, henceforth arms 426 and 426' will be referred to as 426, unless specifically noted otherwise. The flexible arms 426 may be made of a suitable material, generally metal or plastic, which is suitably flexible as to be sensitive to the addition or removal of a small volume to or from the wells, as will be explained in more detail below.

Arm 426 is generally flat and, as shown in the inset in FIG. 4B, each arm 426 and 426' has a generally rectangular portion 426a from which extend, at two adjacent corners thereof, protrusions, which form a partial annulus 426b that extends more than half-way but not completely around cylindrical well supporting element 430, and is sized to have an inner circumference slightly larger than the outer circumference of cylindrical well supporting element 430. Within partial annulus 426b is formed a ring 426c, which is sized to have the same inner circumference as cylindrical well supporting element 430. Cylindrical well supporting element 430 is thus affixed to ring 426c (the upper surface of cylindrical well supporting element 430 being attached to the lower surface of the ring 426c of arm 426 and the lower surface of cylindrical well supporting element 430 being attached to the upper surface of the ring 426c of arm 426'), for example by an adhesive. This construction enables a pair of arms 426 and 426' to hold well supporting element 430 in place in the x- and y-axes but allows movement of the element and the well contained therein along the z-axis, with concomitant bending of arms 426.

In order to maximize and localize the strain felt by the arms at rectangular portions 426a and partial annuluses 426b, the partial annuluses 426b and rectangular portions 426a are formed of a suitably thin and flexible material, such as metal or plastic. In some embodiments, to facilitate bending, arms 426 and 426' are made thinner than the rest of plates 474 and 476, respectively. In some embodiments, portions of plates 474 and 476 exterior to arms 426 and 426' are adhered, or otherwise attached, to frame 422 and/or to an electronic card 446 (described in more detail hereinbelow), so as to strengthen portions of the plates 474 and 476 which need not bend, thereby localizing the strain felt by the arms 426.

It will be appreciated that typically not more than several hundred microliters, and in some applications only a few microliters or less of fluid are added to a given well. For example, less than 300 microliters (µl), less than 250 µl, less than 200 µl, less than 150 µl, less than 100 µl, less than 75 µl, less than 50 µl, less than 45 µl, less than 40 µl, less than 35 µl, less than 30 µl, less than 25 µl, less than 20 µl, less than 15 µl, less than 10 µl, less than 5 µl, less than 4 µl, less than 3 µl, less than 2 µl, or less than 1 µl may be added to a given well. Consequently, the flexible arms 426 should be of suitable flexibility to deflect in response to the addition (or removal) of such quantities of fluid (or the equivalent masses) to (or from) the wells.

When assembled together, the outer circumference of cylindrical well supporting elements 430 is slightly smaller than the inner circumference of bores 452, thereby forming small gaps 438 between the well-defining skeleton 450 and the cylindrical well supporting elements 430 (see FIG. 4C). The presence of these gaps allows for independent movement of each well-supporting element 430 along the vertical (z-) axis and concomitant deformation of arms 426, as will be explained below.

In order to seal the gaps 438 without inhibiting such vertical movement, a very thin (e.g. approximately 7 micron) film 440 of a flexible material, such as a suitable plastic, is attached to the upper edge 442 of the frame 422, and in some embodiments also to an upper card 446 (described in more detail hereinbelow). Film 440 includes 96 circular openings 443 which are aligned with the apertures 447 in cards 446 (described hereinbelow), with rings 426d discussed in more detail below, and with apertures 433 in the assembled well-supporting elements 430.

Film 440 is attached to frame 422 using any suitable means, such as soldering, adhering, melting, bonding, or any other suitable attachment mechanism. It will be appreciated that in the embodiment shown, each well-defining element 419 may be easily removed from the well-supporting element 430 in which it is positioned, without damaging the sensitive structure and functionality of arms 426.

Each arm 426 has a pair of flat strain gauges 444 attached alongside one another on the upper face thereof at the rectangular portion 426a. Alternately, the strain gauges may be attached to upper and lower faces of rectangular portion 426a. Each strain gauge is electrically coupled, for example via wires (not shown), to an electronic card 446. In some embodiments, arms 426 may be formed with holes 445 to facilitate the passage of such wires therethrough. Electronic cards 446 are positioned so as to minimize the length of the connections between the strain gauges 444 and the cards.

In some embodiments, such as that shown in an enlarged portion of FIG. 4B, which in order to shown certain details is rotated 90 degrees about a longitudinal axis of the well-supporting element relative to the rest of the FIG. 4B, well-supporting elements 430 may include protecting protrusions 431a at top and bottom rims thereof, which protecting protrusions are designed to protect strain gauges 444. Additionally, in some embodiments, well-supporting elements 431 may include top and bottom protrusions 431b, rotationally offset from protrusions 431a by 180 degrees, which protrusions 431b engage plates 474 and 476 and limit the range of deflection of arms 426.

In some embodiments, cards 446 (each of which may actually be a plurality of cards) are electrically coupled, via a plurality of wires (not shown) to a port 458 located on frame 422, which port is configured for connection to an electrical port of a suitably equipped plate base and data reader, as described hereinbelow with reference to FIGS. 8 to 9A. In some embodiments, cards 446 (each of which may actually be a plurality of cards) are electrically coupled, via a plurality of wires (not shown) to a USB port (not shown), or to a similar input/output port such as is presently known or as may be developed in the future, located on frame 422, which port is configured for connection of plate 400 to a power source and/or to a computation device. The data reader and/or the computation device to which plate 400 may be connected may run a Graphical User Interface as described hereinbelow with reference to FIGS. 5A to 7. Preferably, port 458 and/or the USB port (not shown) does not extend beyond, and preferably is flush with, the outer surface of frame 422 and does not affect the overall dimensions of plate 400, thus allowing use of standard equipment.

In some embodiments, plate 400 further includes a power supply (not shown) such as a rechargeable battery, for example connected to electronic card 446, which power supply provides power to electronic components of plate 400 and may be recharged when plate 400 is connected to a power source or computation device via port 458 or a USB port.

Each electronic card 446 includes 96 apertures 447 having a circular cross-section, such that when plate 400 is assembled, apertures 447 are aligned with rings 426d, with sections 452, and with well supporting elements 430. Arranged near apertures 447 are an additional ninety-six smaller apertures 448. Apertures 448 allow for the passage of wires (not shown) connecting the strain gauges 444 to cards 446.

Electronic cards 446 may have located thereon an element for measuring electrical resistance in a circuit, such as a Wheatstone Bridge. The deflection of the arms 426 leads to a change in the length of the resistors in corresponding strain gauges 444, which is correlated to the change in electrical resistance in a circuit, which change is measured by the elements on electronic cards 446, using e.g. a Wheatstone Bridge. The change in the electrical resistance in the circuit allows for calculation of the mass of the fluid added to (or removed from) each well. Specifically, a greater mass of fluid added to (or removed from) the well, results in a greater change in the deflection of arms 426, which in turn leads to a greater change in the electrical resistance in the circuit. Thus, measurement of changes in the electrical resistance in the circuit is indicative of a change in the mass of fluid in the well, and allows for calculation of this change. If the density of the fluid is known, this facilitates computation of the volume of fluid added (or removed). As such, arms 426 together with strain gauges 444 form a signal provider, for providing a signal indicative of a change in the amount of fluid in a well associated therewith. In some embodiments, the electronic cards 446 include a storage component, for storing signals generated by the signal provider, for example when the plate 400 is not connected to a data reader such as the data reader of FIG. 8. Such stored signals may then be retrieved from the cards 446 by a data reader when the plate 400 is connected thereto.

For example, if rows A through L of plate 400 are filled sequentially using an 8-tip dispenser, or if individual wells are filled sequentially, or even if all the wells are filled simultaneously, it is possible to calculate the amount of fluid added to each well, and thereby to identify in real time, on a well-by-well basis, when an incorrect amount of fluid, either too much or too little, has been added to a particular well.

Preferably, the apparatus used to add fluid to the wells will be equipped with control software that will allow the apparatus used to correct for the error. In the case in which too little fluid has been added, additional fluid may be dispensed to the affected well so as to reach the correct amount of fluid in the well, and/or the software may be able to adjust for the error by adding proportionately less reagent or reactant liquid to the affected well in later manipulations. Similarly, if too much fluid has been added to a particular well, the addition of reagents or reactants in further manipulations may be scaled up appropriately.

Alternately, the affected well, or well containing element, may be included in further manipulations during the remainder of the experiment, and the results of the particular well may be used in the calculations at the end of the experiment by adjusting the calculations to account for the incorrect volume used while conducting the experiment. As a further alternative, identification of a particular well as having had an incorrect amount of fluid added thereto allows that particular well to be discarded from the calculations at the end of the experiment, rather than discarding the results for the entire row or column in which the well is located, or for the entire plate.

It will also be appreciated that even if all the wells are filled simultaneously, the use of plate 400 in conjunction with appropriate software to identify in real time the addition of an incorrect amount of fluid to a specific well supporting element 430, enables the user to stop running experiments using the well in that particular element or in the plate 400, thus avoiding waste of reagents, reactants and the like in downstream experiments.

It will further be appreciated that the plate 400 may also operate without being continuously monitored. In such cases, a baseline measurement of a well or of the plate is obtained from the signal provider. Subsequently, the plate may be disconnected from the power source and/or the data reader or processor to which the signals are provided, and fluid added to or removed from the plate. The plate may then be reconnected to the power source and/or the data reader or processor, and a second signal obtained from the signal provider. Comparison of the initial and second signals enables identification of specific wells where an incorrect amount of fluid is present, allowing for those wells to be discarded from further experiments and computations.

In some embodiments, plate 400 also includes one or more temperature sensors (not shown), electrically coupled to electronics cards 446, and configured to provide an indication of the temperature, or of a temperature change, in the vicinity of one or more of wells 417. It is appreciated that a temperature change in the system may affect the strain gauges 444, and therefore knowledge of, and computational consideration of changes to the temperature can allow for more accurate identification of the weight in a well and for ensuring a stable temperature of the sample in the well, which may be sensitive to temperature changes.

Additionally, electronics cards 446 may have electrically coupled thereto components for manipulating data collected by the various sensors elements coupled to the cards, such as an analog-to-digital converting component for converting the analog signals of the Wheatstone Bridge to digital signals, and normalizing components for normalizing the collected signals.

Because the deflection of each arm can be calculated, and thus the amount of material or volume of liquid added to each individual well can be calculated in real time, the use of plate 400 facilitates the correcting of the amount of material to be added to each well, or the ignoring of an individual well, rather than a row of wells or the whole plate, in further experimental manipulations. Also, with this configuration it is possible to observe loss of material from a given well over time, as will be described hereinbelow with reference to FIGS. 5A-7.

In accordance with some embodiments of the invention, plate 400 includes means for heating and, optionally, cooling individual wells. Such heating means may take the form of, for example, (a) a heating coil disposed around at least a portion of the well, or (b) a Peltier device, sometimes called a Peltier heat pump or thermoelectric cooler. As will be appreciated, a Peltier device can be used to cool as well as to heat an individual well, as well as to sense or monitor the temperature in the well or in the vicinity thereof. In this way, the temperature in individual wells may be controlled, for example the temperature in each well may be maintained at 37° C.±0.5° C.

In one embodiment, a Peltier device for each well may be built into one or both electronics cards 446 shown in FIG. 4B, for example adjacent each aperture 447 for heating of a specific well-supporting element 430 or well-defining element 419 disposed in the aperture. Alternatively, a heating coil or Peltier device may be disposed on some of or on each of the well-supporting elements 430 or the well-defining elements 419, for heating the well associated therewith or the interior thereof. As a further alternative, a heating coil or a Peltier device may be disposed adjacent a group of well-supporting elements 430 or well-defining elements 419, for example on electronic card 446, for heating the wells in the group or the interiors thereof. Although reference is made to FIG. 4B, it will be appreciated that the provision of such well heating means is not limited to plates in which the wells are displaceable along the z-axis, and that such heating means may be provided in plates in which the wells are not displaceable.

It will also be appreciated that if the temperature of the wells is periodically measured, and if the device used to measure the temperature is coupled to a controller that controls the heating means for each individual well, then the individual well heating means, used in conjunction with the periodic measuring of temperature in individual wells, can provide a way to improve control over the conditions in a given well. Thus, for example, plates 400 having such heating means may be stored in an incubator and the temperature of the wells monitored periodically and the temperature of individual wells adjusted, if necessary, by heating (or cooling) individual wells. Alternatively, the heating means may themselves be used to effect incubation, for example temperature monitoring and adjustment may be effected frequently, say for example every 15, 10 or 5 minutes, to maintain the temperature in particular wells at e.g. 37° C.±0.5° C. so as to effect incubation. Thus, by equipping the plate 400, the well-supporting elements 430, or the well-defining elements 419 with individual heating elements for each well, in cases in which it is found that the temperature is incorrect, the temperature may be adjusted and controlled.

It will be appreciated that since reagents and other fluids may be added into or removed from well-defining elements 419, which may be removed from plate 400 and optionally disposed of, plate 400 may be used multiple times and/or for multiple experiments, provided that well-defining elements 419 are replaced between each use of the plate 400.

Reference is now made to FIGS. 5A to 5D, which are screen shots illustrating a graphical user interface for on-line (real-time) monitoring of addition of fluid to a multi-well plate in accordance with embodiments of the teachings herein.

As described hereinabove, multi-well plates in accordance with embodiments of the present invention, such as multi-well plate 300 of FIGS. 3A to 3G and multi-well plate 400 of FIGS. 4A to 4C, may be electrically coupled to a processor, for example via a suitably equipped plate data reader, as described hereinbelow with reference to FIGS. 8 to 9B, or via a USB or other cable connected to a computation device such as a computer. The graphical user interface of FIGS. 5A to 5D runs on such a processor coupled to the plate, using data provided to the processor from the electronics cards of the plates (such as electronics cards 546 and 646). The processor may be configured to provide only graphical user information, or it may also be configured to control the amount fluid dispensed into the wells.

It will be appreciated that the data for providing online monitoring depends on measurement of a baseline electrical resistance measured by the strain gauges on the plate (such as strain gauges 344 and 444), which baseline measurement when monitoring the filling of a well generally corresponds to an empty well. Once fluid is dispensed into the well, the electronics cards provide to the processor an indication of the volume of fluid added into each well, thereby facilitating the function of the graphical user interface as described hereinbelow. In some embodiments, the analog data representing the baseline electrical resistance is normalized and converted to digital data by suitable elements located on the electronics cards of the plate, such that the processor receives data suitable for use in the graphical user interface.

As seen, a graphical user interface 500 is associated with experiment planning software (not shown), such that the specific details of the experiment being conducted, such as the experiment name, the material used, the volume(s) of liquid(s) to be dispensed, the volume upper and lower limits, the required accuracy (i.e. the experimental sensitivity), and any other suitable experimental parameters are displayed in an information box 502 of the graphical user interface. The details included in information box 502 provide an indication to the user of the criteria that will be used to alert the user of incorrect addition of material to any one or more wells, as described hereinbelow. It will be appreciated that in some embodiments, the software running the apparatus dispensing the fluid is able to calibrate quantities to be dispensed and the degree of sensitivity to be used based on these experimental parameters.

Graphical user interface 500 further includes a graphic representation 504 of a multi-well plate in which the experiment is currently being conducted, based on information provided from the electronics card of the plate. Graphic representation 504 of the plate includes a plurality of circles 506, each corresponding to a well in the plate (here shown as a 96 well plate), as well as indications of the rows and columns of the plate, indicated by reference numerals 508 and 510, respectively.

The purpose of online monitoring of addition of fluid to the plate is to facilitate real time control of the volume of fluid added to the plate. The graphic user interface 500 allows a user to monitor the situation in real time and, in cases in which control of the process is not completely automated after the initial inputting of parameters, to instruct the system as necessary to correct the fluid volume or take other steps to compensate for an incorrect volume in a given well. Typically, the graphic user interface additionally provides a graphic indication whether the target volume of fluid has been reached, or whether additional fluid should be added to the plate. In some embodiments, such as that shown in FIGS. 5A to 5D, the graphic indication comprises a fill pattern or color indication, such that a first fill pattern or color represents an empty well, a second fill pattern or color represents a well in which the volume of fluid is less than the target volume of fluid, and a third fill pattern or color represents a well in which the volume of fluid is correct and is equal to the target volume of fluid, within the specified tolerance. In some embodiments, a fourth fill pattern or color is used to represent a well in which the target volume of fluid has been exceeded.

Figure 5A:
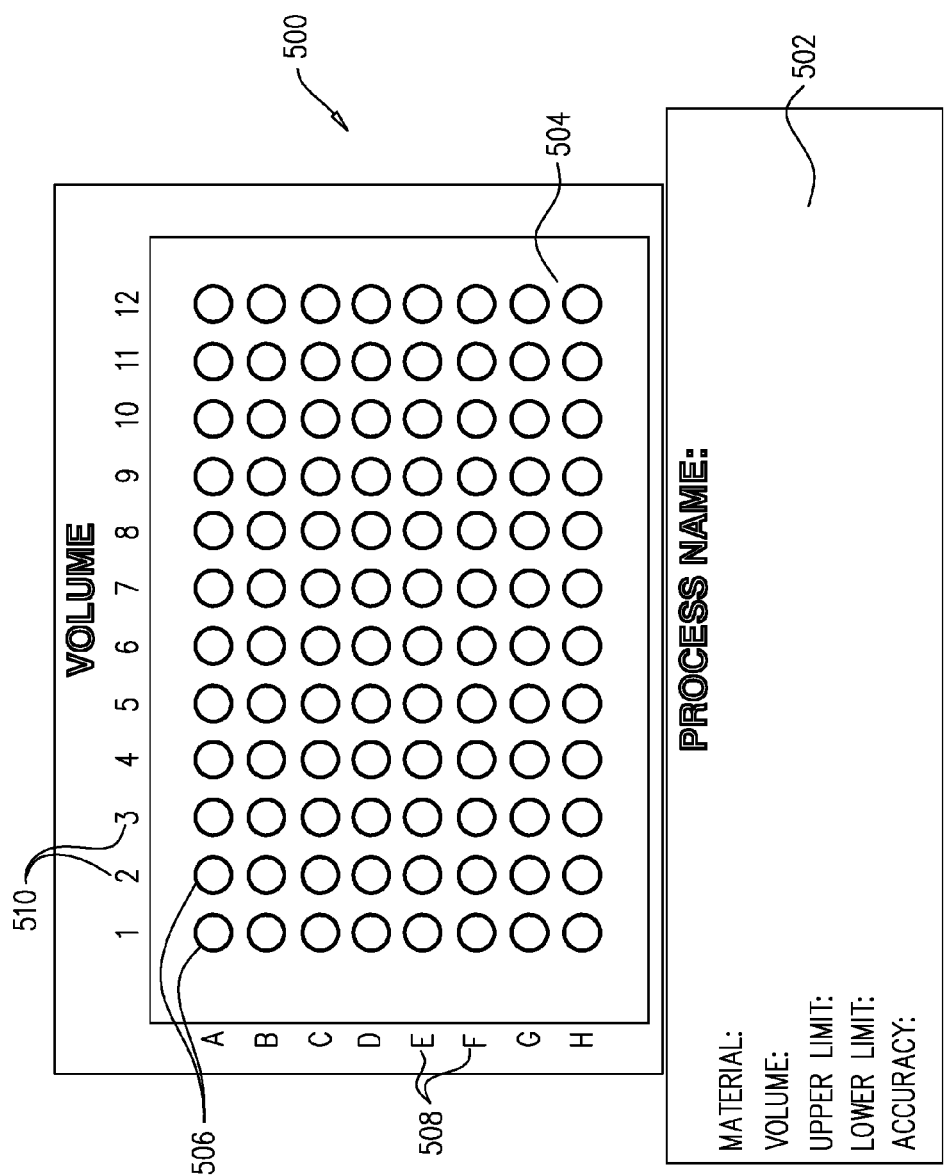
FIGS. 5A-5D are screen shots illustrating a graphical user interface for on-line (real time) monitoring of addition of fluid to a multi-well plate in accordance with embodiments of the teachings herein.

FIG. 5A illustrates the graphical user interface 500 prior to the beginning of the experiment. As such, all the circles 506 have no fill pattern (or are in a first color), which is indicative of an empty well.

Figure 5B:
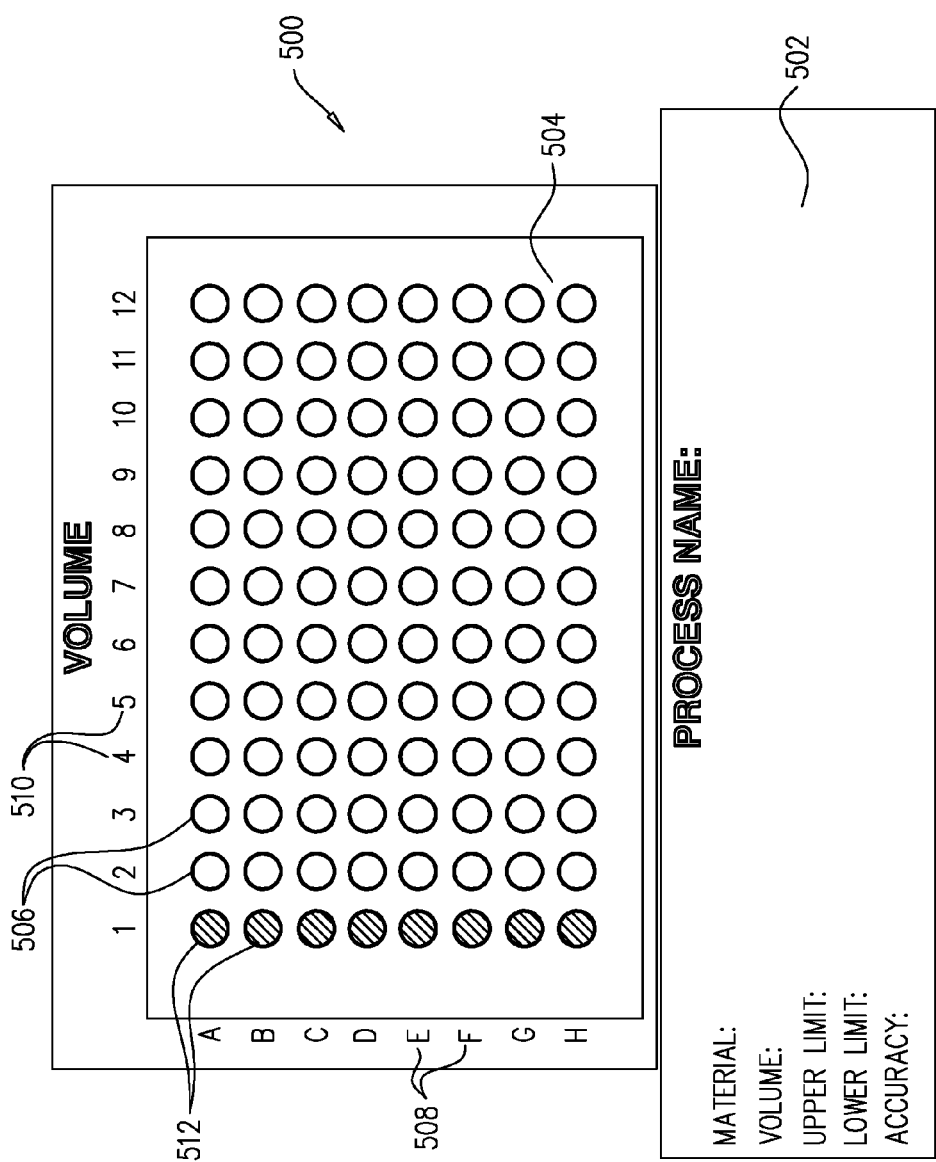

FIG. 5B illustrates the graphical user interface 500 when dispensation of fluid into column 1 of the plate has begun. As seen, in graphic representation 504, the circles 512 corresponding to the wells of column 1 (wells A1, B1, C1, D1, E1, F1, G1, and H1) have a second fill pattern (or are in a second color), here shown as diagonal lines sloping from right to left, indicative of a volume of fluid, which is less than the target volume, being in the wells, while the remaining circles 506, corresponding to wells in columns 2-12, remain in the pattern or color indicating empty wells.

In some embodiments (not shown), graphic representation 504 indicates the volume of fluid that must be added to a well in order to reach the fluid target volume in that well. For example, this may be achieved by scrolling a pointer, such as is controlled by a computer mouse, over one of circles 506 resulting in a pop-up box indicating the volume that should be added to the corresponding well.

Figure 5C:
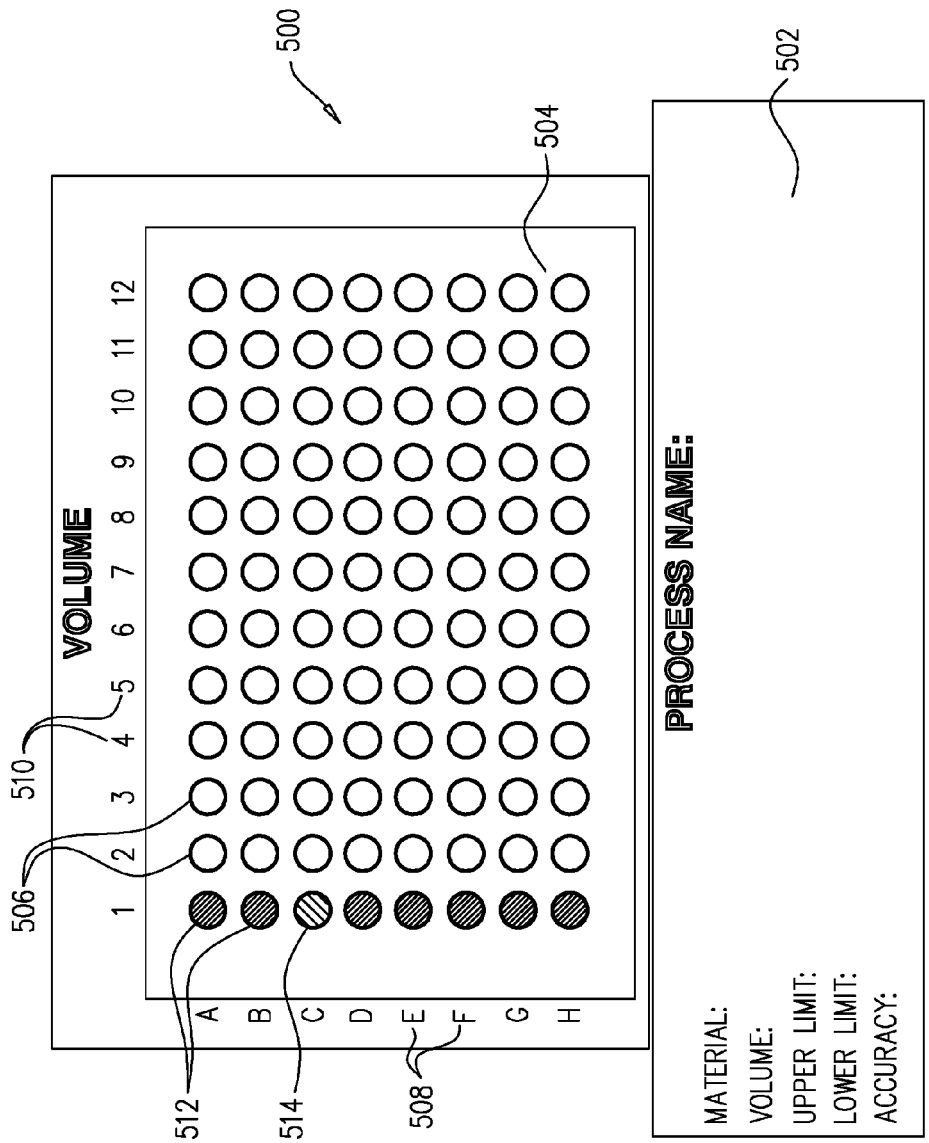

In FIG. 5C it is seen that as dispensation of fluid into the wells of column 1 continues, most of the circles 512, corresponding to wells in which the target volume of fluid has been reached, are represented in a third fill pattern (or are in a third color), here shown as dense diagonal lines sloping from left to right, indicative of reaching the target volume. The graphic representation 504 additionally indicates that in well C1 the target volume of fluid has not yet been reached, by maintaining circle 514, corresponding to well C1, in the second fill pattern of diagonal lines sloping from right to left (or in the same color).

Alternately, in embodiments in which the amount of fluid in the wells is determined only after completion of dispensation of fluid into a well (as opposed to making continuous or multiple determinations as the well is filled, for example if liquid is dispensed continuously but slowly or is dispensed drop-wise), graphic representation 504 does not provide information such as that shown in FIG. 5B. Rather, once the fluid has been dispensed, graphic representation 504 indicates in which wells the volume of fluid falls short of (or exceeds) the required volume, in a manner similar to that shown in FIG. 5C.

Figure 5D:
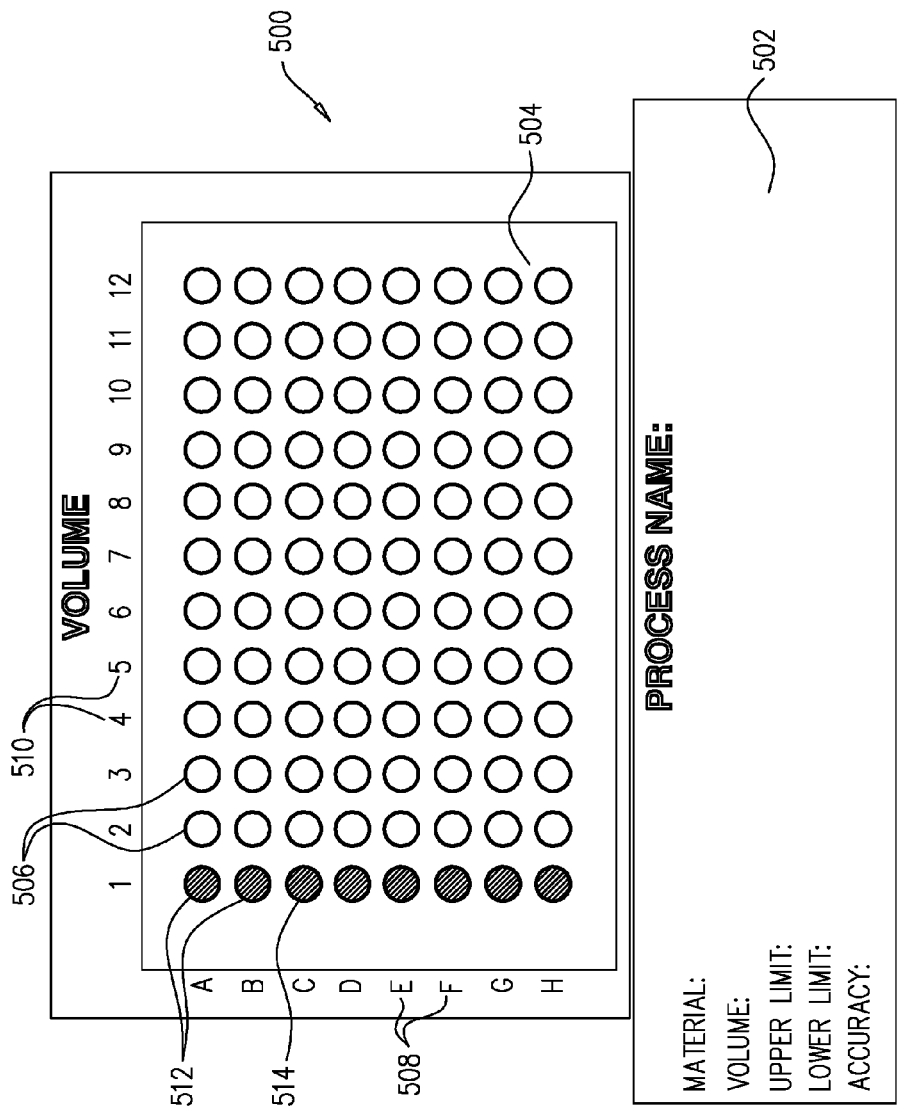

FIG. 5D is identical to FIG. 5C, but illustrates the graphical user interface following the dispensation of additional volume fluid into well C1 so as to correct the initial shortfall, such that the volume of fluid in well C1 is equal to the target volume for the experiment. As all the wells of column 1 are now correctly filled with the target volume of fluid, the corresponding circles 512 are represented with the third fill pattern of dense diagonal lines sloping from left to right (or in the third color), indicating that the target volume has been reached.

As fluid is dispensed into wells in additional columns of the plate, the graphic representation 504 changes, such that the color of each circle 506 is indicative of the volume of fluid in the corresponding well, thereby providing a real-time indication of the volume of fluid in each well, and assisting in preventing errors in the volume of fluid added to the wells.

In some embodiments, fluid is dispensed into all the wells 506 of the plate simultaneously, whether incrementally, continuously slowly or continuously quickly. In such embodiments, graphic representation 504 provides indications, similar to those shown in FIGS. 5B, 5C, and 5D, for all the wells at once, rather than row by row as described hereinabove.

Figure 6A:
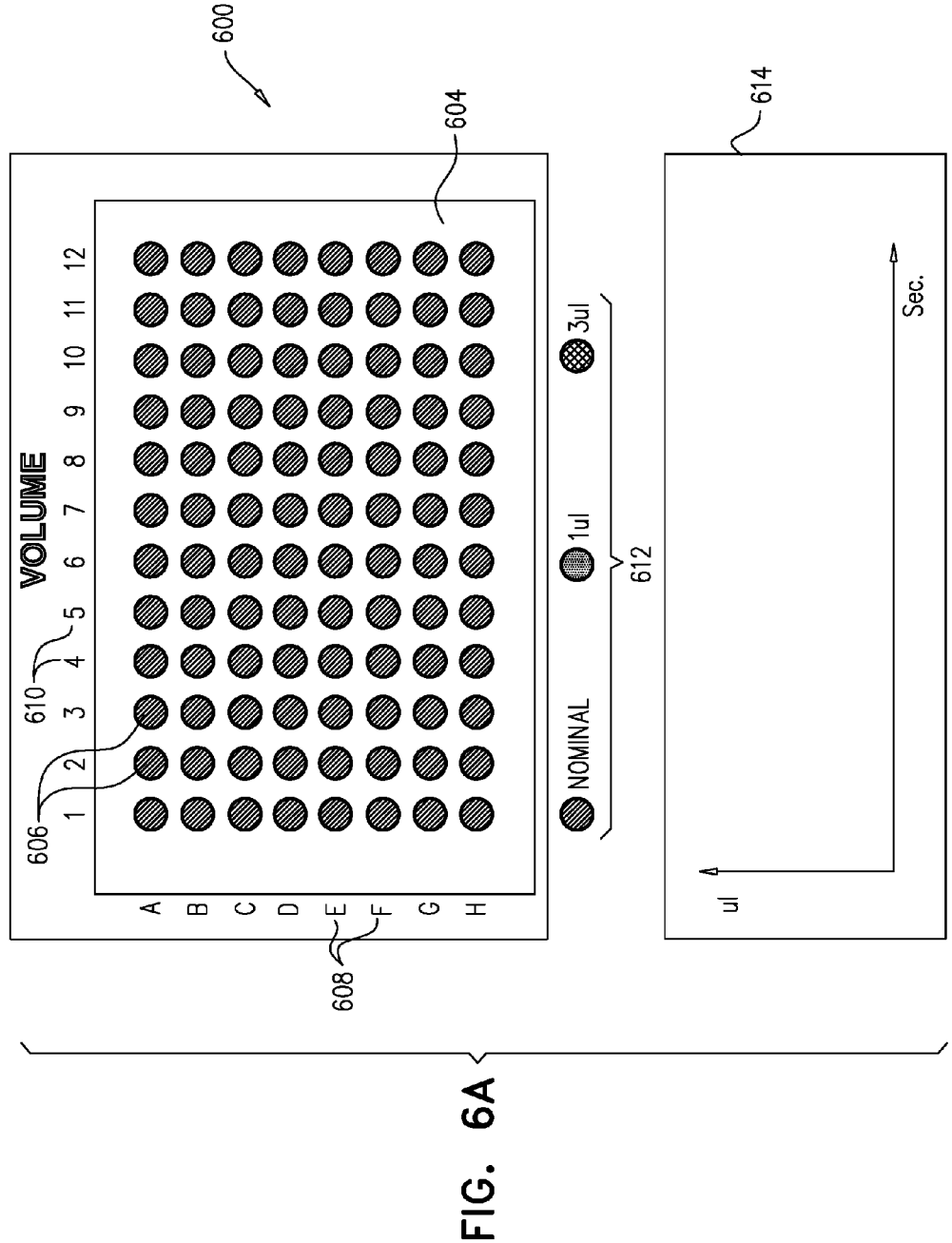
FIGS. 6A and 6B are screen shots illustrating a graphical user interface for off-line volume monitoring of fluid in a multi-well plate in accordance with embodiments of the teachings herein.
Figure 6B:
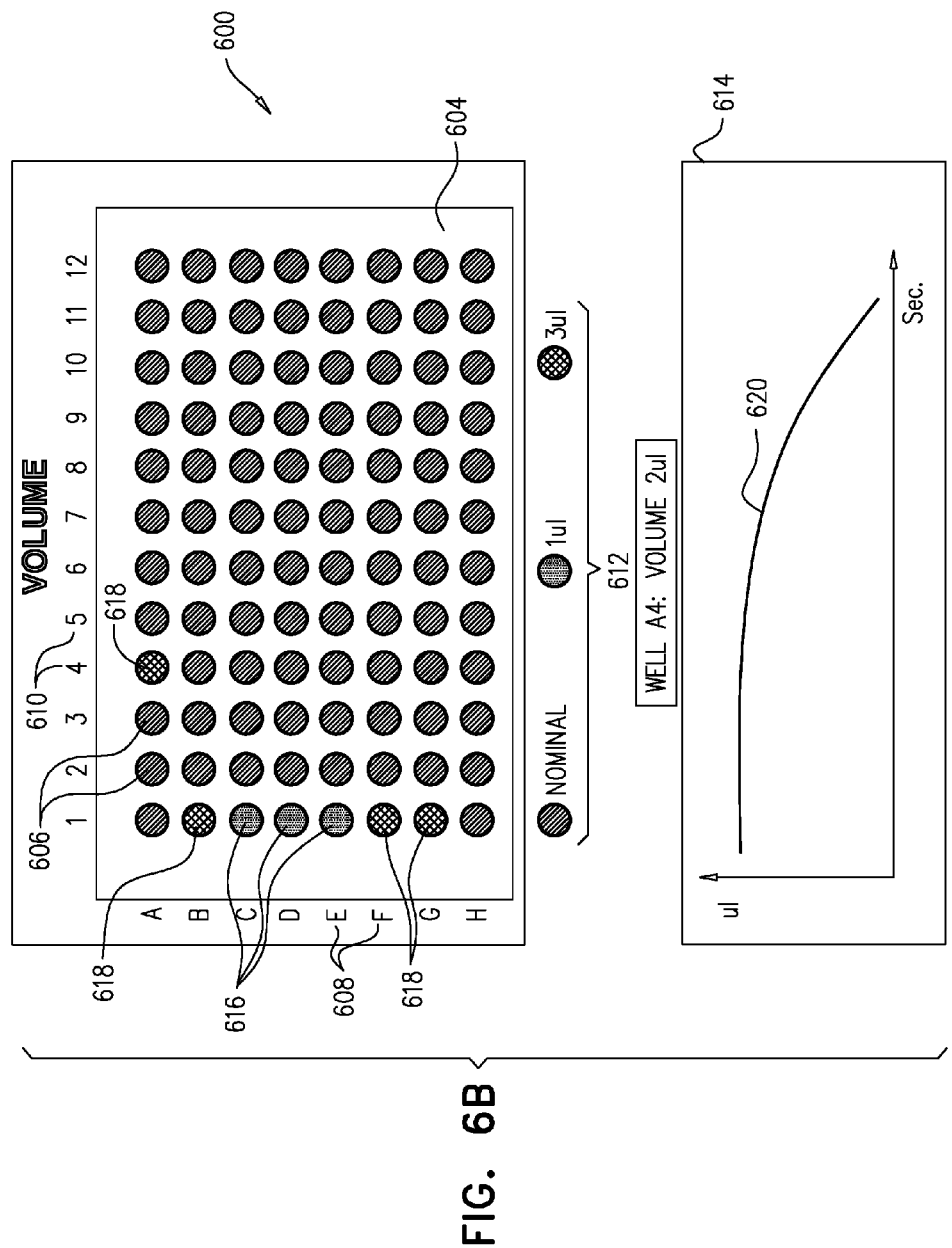

Reference is now made to FIGS. 6A and 6B, which are screen shots illustrating a graphical user interface for off-line volume monitoring of fluid in a multi-well plate in accordance with embodiments of the teachings herein.

Graphical user interface 600 of FIGS. 6A and 6B is similar to graphical user interface 500 of FIGS. 5A to 5D, in that it runs on the processor coupled to the plate, using data provided to the processor from electronics cards of the plates (such as electronics cards 346 and 446) via a plate data reader or a USB or other connector as is presently known or may be developed in the future. Similarly, graphical user interface 600 includes a graphic representation 604 of a multi-well plate in which the experiment is currently being conducted, based on information provided from the electronics card of the plate. Graphic representation 604 of the plate includes a plurality of circles 606, each corresponding to a well in the plate (here shown as a 96 well plate), as well as indications of the rows and columns of the plate, indicated by reference numerals 608 and 610, respectively.

However, during off-line monitoring, the purpose is not to indicate to the user whether or not an appropriate volume of fluid has been dispensed into a well, but rather to provide an alarm if, for some reason, the volume of fluid in a well has dropped below the target volume, or below a predetermined threshold value. As such, graphical user interface 600 is not associated with experiment planning software, but rather has inputted thereto values at which the user should receive an indication that the volume in a well is inappropriate, such as an alarm or an audible or text notification to take corrective action. In some embodiments, the values are predetermined absolute volume values, such that when the volume of fluid in a well drops below the predetermined volume, the graphical user interface 600 provides an indication of a specific well in which the volume is low. In some embodiments, such as the illustrated embodiment, the values are volume change values, such that the graphical user interface 600 provides an indication when the volume of fluid in a well changes by more than a predetermined value. In a variation on this (not shown), an indication may be given when the volume falls by more than certain percentage below a predetermined baseline value. The values used for providing an indication to the user may be default values, or may be set by the user based on the sensitivity of the experiment, or based on other considerations as suitable.

As seen in FIGS. 6A and 6B, volume changes of different magnitudes are indicated by different fill patterns or colors, and a legend 612 is provided so that the user can identify, based on the fill pattern or color of a circle 606, how much fluid is missing from the corresponding well. In the illustrated embodiment a fill pattern of diagonals indicates that the volume of fluid in the corresponding well is unchanged, and is equal to the initial volume, a dotted fill pattern indicates a change of less than one microliter in the volume of fluid in the corresponding well, and a checkered fill pattern indicates a change of at least 1 microliter but less than three microliters in the volume of fluid in the corresponding well.

Graphical user interface 600 further includes one or more graphs 614, in which the volume of fluid in one or more specific wells may be plotted as a function of time. In some embodiments, the specific well for which information is displayed in graph 614 may be selected by the user, for example by pointing the cursor of the mouse to a specific well or by typing the well identification in a suitable text box (not shown). In some embodiments, information corresponding to each of the wells may be displayed sequentially and/or repeatedly in graph 614.

Typically, the data reader or USB or other connector associated with the electronics cards of the plate reports the measured volume in each well to the processor at a fixed rate, for example once every day, once every hour, once every minute, once every half a minute, or even once every second. The exact rate may be factory coded in the electronics card, or may be set by the user in accordance with the demands of the experiment being conducted.

Turning to FIG. 6A, it is seen that at a first time point T1, there is no change in the volume of fluid in any of the wells, and thus all of circles 606 are filled in the fill pattern corresponding to the nominal volume, diagonal lines. Since there is no change in the volume of fluid in any of the wells, no plot is presented on graph 614.

In FIG. 6B, which illustrates the graphical user interface at a second time point T2 later than T1, it is seen that circles 616 corresponding to wells C1, D1, and E1 are filled in the fill pattern indicating a change of less than 1 microliter in the volume of fluid in the wells (dots), and circles 618 corresponding to wells A4, B1, F1, and G1 are filled in the fill pattern indicating a change of at least 1 microliter but less than 3 microliters in the volume of the fluid in the wells (checkered). In the illustrated example, graph 614 depicts a plot 620 of the change in volume in well A4 as a function of time, based on multiple readings of the volume of fluid in well A4.

Figure 7:
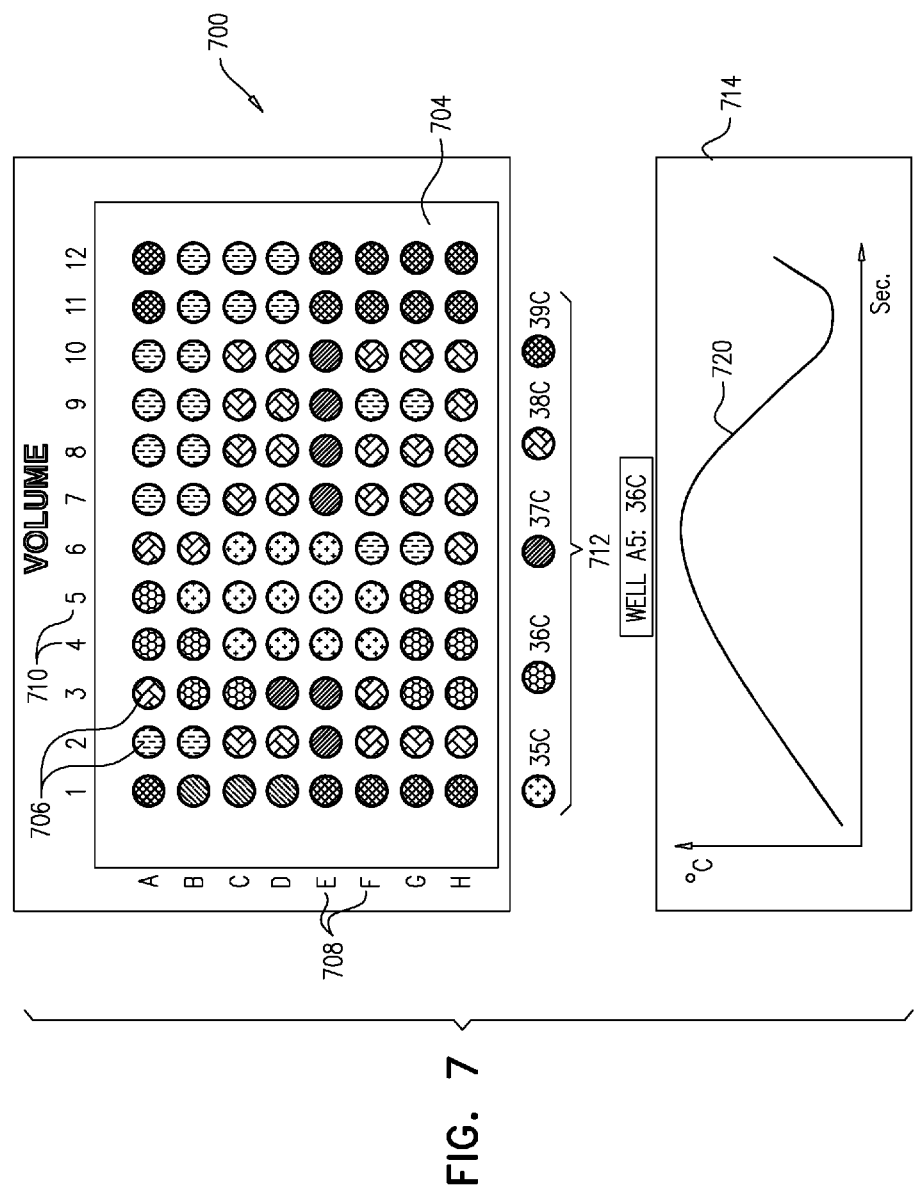
FIG. 7 is a screen shot illustrating a graphical user interface for off-line temperature monitoring of fluid in a multi-well plate in accordance with embodiments of the invention.

Reference is now made to FIG. 7, which is a screen shot illustrating a graphical user interface for off-line temperature monitoring of fluid in a multi-well plate in accordance with embodiments of the teachings herein.

Graphical user interface 700 of FIG. 7 is analogous to graphical user interface 600 of FIGS. 6A and 6B, but differs from graphical user interface 700 in that the fill patterns (or colors) of circles 706 represent a temperature of a corresponding well in the plate, as measured by one or more temperature sensors forming part of the plate, and in that one or more graphs 714 may include a plot of the temperature in one or more specific wells as a function of time.

In some embodiments (such as shown in FIG. 7) there is a temperature sensor associated with each well, whereas in other embodiments there may be fewer temperature sensors than wells but still multiplicity of temperature sensors.

As seen in FIG. 7, different temperatures are indicated by different fill patterns (or colors), and a legend 712 is provided so that the user can identify, based on the fill pattern (or color) of a circle 706, what the temperature is in, or in the vicinity of, the well.

In FIG. 7 it is seen that at a time point T1, each well has a specific temperature as indicated by the fill patterns of the corresponding circle 706. For example, the fill pattern of circle 706 corresponding to well E1 indicates that the temperature of well E1 is 39° C.

In the illustrated example graph 714 includes a plot 720 showing the change in temperature at well A5 as a function of time.

Typically, the data reader or USB or other connector associated with the temperature sensor(s) of the plate reports the temperature in each well or in the vicinity of each sensor to the processor at a fixed rate, for example once every day, once every hour, once every minute, once every half a minute, or even once every second. The exact rate may be factory coded in the electronics card, or may be set by the user in accordance with the demands of the experiment being conducted. As such, the fill patterns (or colors) of circles 706 in graphical user interface 700 change when the data reader indicates a change in the temperature of the corresponding wells, as measured by the temperature sensor(s).

It will appreciated that since well-containing elements 348 and well-defining elements 419 are removable from their respective plates 300 and 400, it is possible to obtain measurements using elements 348 or elements 419, as described above, and then to remove elements 348 or elements 419 and insert them into other, simpler plates (not shown) which lack the detecting means detailed above, for storage, for example for storage in a refrigerator or incubator. At a later time, if another measurement is desired, elements 348 or elements 419 may re-inserted into plate 300 or 400, respectively.

Figure 8:
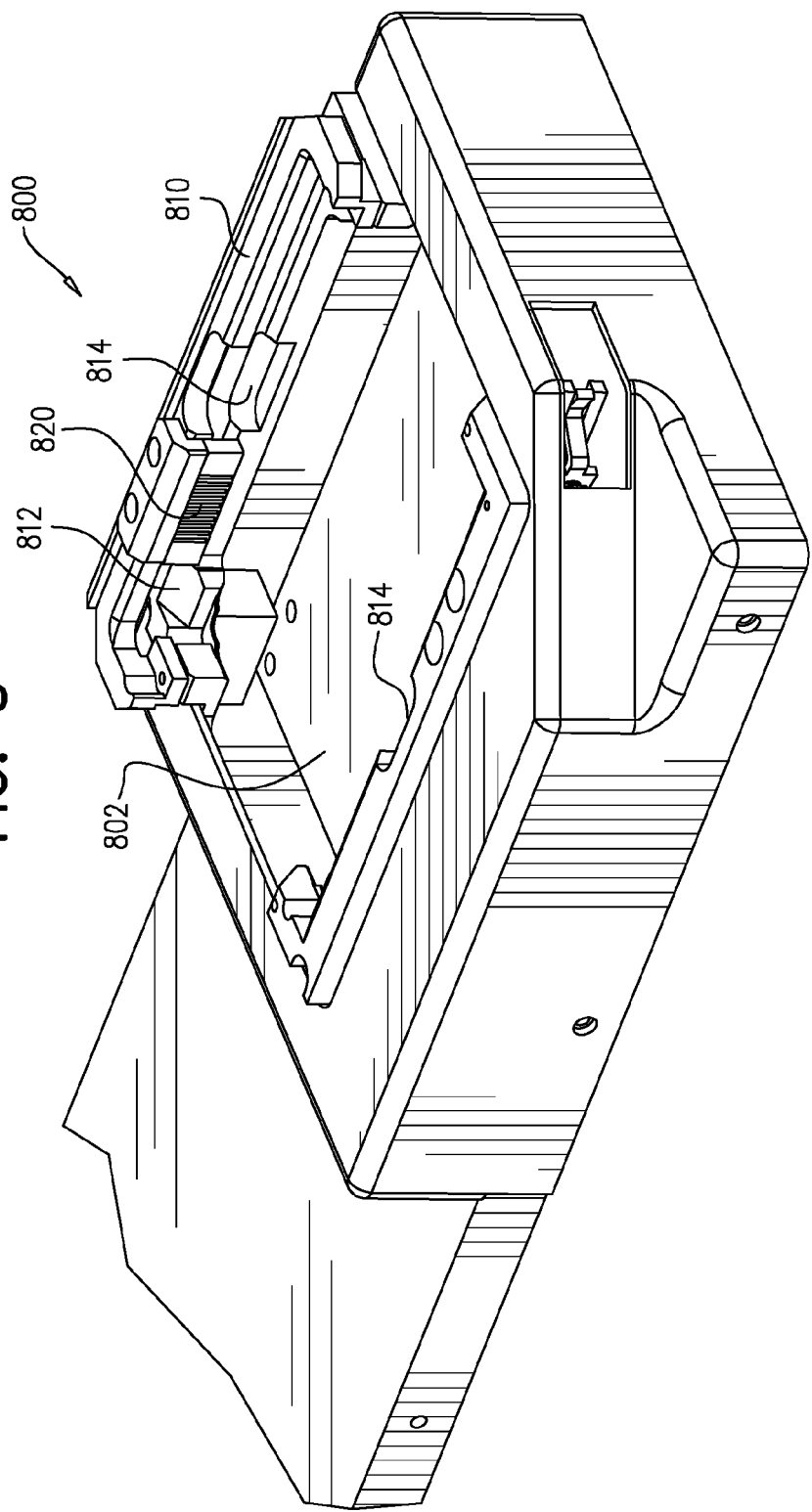
FIG. 8 is a perspective view of a plate base and data reader constructed and operative in accordance with an embodiment of the teachings herein, for receiving signals from a multi-well plate in accordance with the teachings herein.

Reference is now made to FIG. 8, which is a perspective view of a plate base and data reader 800 constructed and operative in accordance with an embodiment of the teachings herein, for receiving signals from a multi-well plate in accordance with embodiments of the invention.

As seen in FIG. 8, the base plate and data reader 800 includes a base 802 having formed thereon a frame 810, suitably shaped and sized for receipt therein of a multiwell plate, such as plate 200, 300, or 400 described hereinabove. In some embodiments, the base plate and data reader 800 may form part of an optical instrument or imaging device, such as, for example, the Hermes system (http://www.idea-bio.com/page-87-_Hermes.aspx) commercially available from Idea Bio-Medical Ltd. of Rehovot, Israel. In some such embodiments, the base 802 may be transparent to at least some wavelengths of illumination, so as to allow for imaging of samples in the multi-well plate by the optical instrument or imaging device while a plate is disposed in the data reader 800.

In some embodiments, frame 810 includes a retaining mechanism for retaining the plate stable and immobile within data reader 800. In some embodiments, the retaining mechanism comprises protrusions 812 which engage the frame of the plate, which protrusions 812 may be retractable into frame 810, for example under the force of a spring. As such, when a user inserts the plate into data reader 800, the user pushes the plate against the protrusions 812, causing the protrusions 812 to retract into frame 810. Once the user stops pushing the plate, for example when the plate is in place, the springs push protrusions 812 outward such that protrusions 812 engage the plate and retain it within data reader 800. In some embodiments, the retaining mechanism may comprise a mechanism for snap-fitting the plate into place on data reader 800, a rim on which the plate may rest, and the like.

In some embodiments, frame 810 includes indentations 814 to assist the user in gripping the plate disposed within frame 810 when the user wishes to remove the plate. Other mechanisms for assisting in removal of the plate from frame 810, such as an eject button, may also be used.

Frame 810 additionally includes an electrical port 820, positioned and configured to electrically engage a corresponding port on the plate disposed within the data reader, for example such as port 358 of FIG. 3B or port 458 of FIG. 4B. Electrical port 820 is also electrically connected to a processor (not shown) for provision of information from the plate to the processor, for example for use of dedicated software such as experiment planning software or Graphical User Interface software as described hereinabove with reference to FIGS. 5A to 7.

Figure 9A:
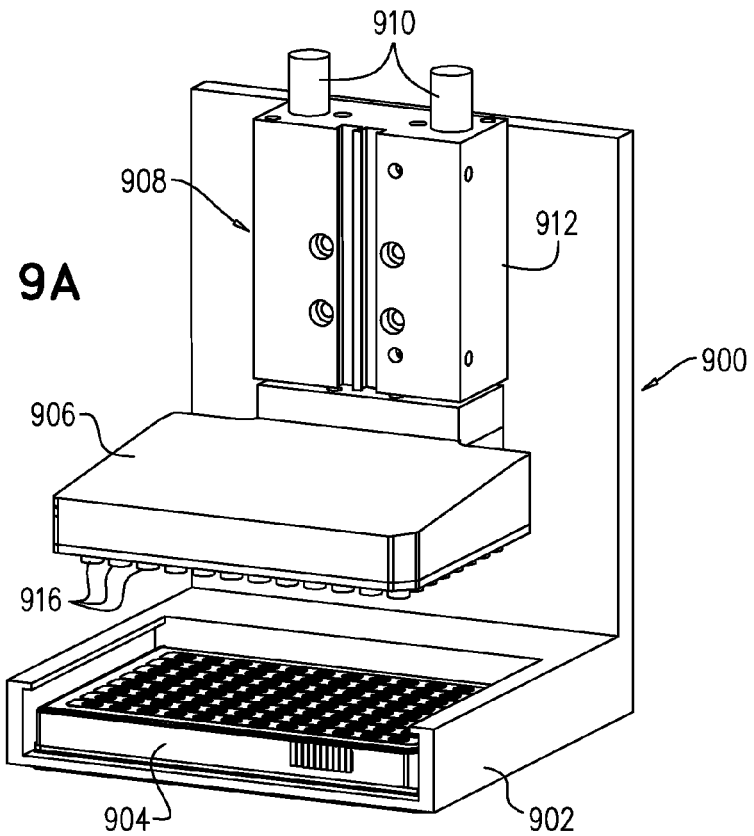
FIGS. 9A and 9B are perspective views of a device for removing well-containing elements or well-defining elements from and/or for emplacing such elements in a multi-well plate, the device constructed and operative in accordance with an embodiment of the teachings herein.
Figure 9B:
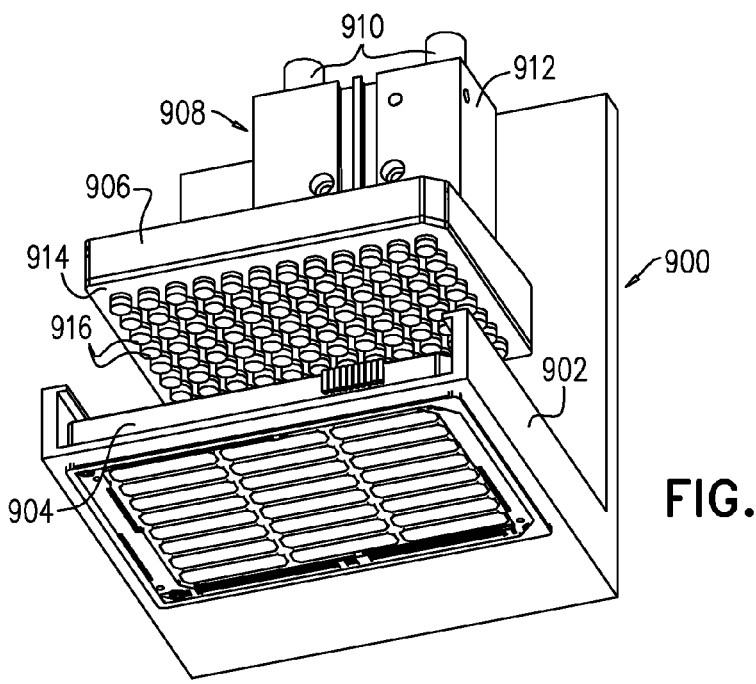

Reference is now made to FIGS. 9A and 9B, which are perspective views of a device for removing well-containing elements or well-defining elements from and/or for emplacing such elements in a multi-well plate, the device constructed and operative in accordance with an embodiment of the teachings herein.

As seen in FIGS. 9A and 9B, a device 900 for manipulation of well containing elements such as elements 330 or of well defining elements such as elements 419 is functionally associated with a plate-bearing base 902 arranged to have a multi-well plate 904 disposed therein. The plate bearing-base 902 may be a data reader and base such as data reader and base 800 described hereinabove, or may be a simple base on which a multiwell plate rests, as illustrated in FIGS. 9A and 9B.

Arranged above plate-bearing base 902 is a well-engaging portion 906 which is movably mounted onto a vertical displacement mechanism 908. Vertical displacement mechanism 908 is configured to enable vertical displacement of well-engaging portion 906 toward and away from a plate 904 disposed on plate-bearing base 902. In some embodiments, vertical displacement mechanism 908 includes vertical mounts 910 and a displaceable portion 912 vertically displaceable along mount 910, such that said well engaging portion 906 is mounted onto displaceable portion 912 and is displaceable therewith.

Disposed on a lower surface 914 of well engaging portion 906 are a plurality of well-engaging protrusions 916, each configured to fit in one of the wells of a well-containing element or a well-defining element to be placed in plate 904 or being removed from plate 904 for attachment thereto. In some embodiments, well-engaging protrusions 916 engage the corresponding wells by snap fit mechanism, though other methods of engagement, such as by vacuum, are also considered.

For placement of well-defining elements or well-containing elements in plate 904, well-engaging protrusions 916 engage the well-defining elements or well-containing elements, and subsequently well engaging portion 906 is vertically displaced toward plate 904 until the well defining elements or well-containing elements are fitted in their suitable locations within plate 904, such as within sections 352 of plate 300 or within well-supporting elements 430 of plate 400. The well engaging protrusions 916 then disengage from the well-defining elements or well-containing elements and well engaging portion 906 is vertically displaced away from plate 904, leaving the elements properly placed within plate 904 and accessible for insertion of reagents thereinto.

For removal of well-defining elements or well-containing elements from plate 904, well-engaging portion 906 is vertically displaced toward plate 904 until the well-defining elements or well-containing elements located within plate 904 engage to well-engaging protrusions 916. Well-engaging portion 906 together with well-engaging protrusions 916 and the wells engaged therewith are vertically displaced away from plate 904, resulting in removal of the well-defining elements or well containing elements from their locations within plate 904. When the well-engaging portion is sufficiently displaced from plate 904, the well-engaging protrusions 916 then disengage from the well-defining elements or well-containing elements.

It is appreciated that a similar device may be used for engaging pipette tips or the like, and for dispensing fluids such as reagents into the wells in plate 904.

Described hereinbelow are variations in construction that may employed with multiwell plates such as those herein described with reference to FIGS. 2A to 4C, and in some cases with other multiwell plates, as well as variations in the methods of using those plates.

The plates described above utilize the physical displacement of wells along the z-axis to determine the volume of fluid dispensed into one or more wells. In the embodiments described above, such physical displacement is coupled to strain gauges, in order to induce a signal that is correlated to the amount of displacement and thus the volume of fluid dispensed into (or lost from) the well(s) under observation (given that a fluid of a known density and mass occupies a determinable volume). However, it will be appreciated that other methods may be employed instead of or in addition to the use of strain gauges to determine volume.

Thus, for example, if a multiwell plate having wells which are displaceable in the z-axis is used in conjunction with a reading device that has an auto-focus mechanism, this may be used to determine the amount of displacement of a well. An example of such an auto-focus mechanism is described in U.S. Pat. No. 7,109,459, entitled "Auto-focusing method and device for use with optical microscopy", the contents of which are incorporated by reference.

To illustrate, a multiwell plate having displaceable wells may be introduced into a reading device having an auto-focus mechanism, such as the Wiscan™ scanner available from Idea Bio-Medical Ltd., Rehovot, Israel. By combining the auto-focus mechanism with appropriate feedback controls, the bottoms of the wells of interest may set to the same height prior to dispensing of fluid. Fluid may then be dispensed into the wells; it will be appreciated that in some cases, this may be done on-line, without moving the plate to another location, whereas in other cases, the plate may need to be moved to a dispensing station. After dispensing of the fluid, the auto-focus mechanism may again be employed (preceded if necessary by return of the plate to the auto-focus location), this time to determine the motion of the well in the z-axis; this information can in turn be used to determine the amount of fluid dispensed in to one or more wells, as described above. Moreover, periodic measurements may be obtained to determine if fluid has been lost from one or more wells, for example through evaporation. This method may be employed with individual wells or with groups of wells, as described above. As noted, this method may be employed in conjunction with or instead of strain gauges to determine the displacement of one or more wells.

As with the methods already described above, detection of an incorrect amount of fluid in a well or group of wells facilitates correction of the amount of fluid in the well(s), exclusion of the well(s) from further manipulations and/or calculations, or in some cases correction of calculations.

Another method for determining the amount of fluid lost from a well involves periodic monitoring of the temperature of the individual well. Often, multiwell plates which contain live cells are incubated at 37° C. However, the heat distribution in the incubator may be uneven, or other factors may cause uneven temperature distribution in the plate, which can lead to differential losses of fluid from different wells and can adversely affect the cells therein. By tracking the temperature of an individual well periodically, for example once an hour, and by taking into account the nature of the fluid in the well, it is possible to determine the amount of fluid lost from the well over time, as well as to correct the temperature in the well, for example using heating or cooling means as described hereinabove. Such monitoring may be facilitated by the placement of individual temperature sensors at each well, for example on the bottom or the side thereof. Such sensors may be electronically coupled to a card, such as 346 or 446 described above, to facilitate reading in a data reader. Alternatively, one or more thermal cameras may be employed to periodically detect the temperature of individual wells.

As with the methods already described above, detection of an incorrect amount of fluid in a well or group of wells facilitates correction of the amount of fluid in the well(s), exclusion of the well(s) from further manipulations and/or calculations, or in some cases correction of calculations. In cases in which the wells of the plate are displaceable along the z-axis, this method may be used in conjunction with or instead of strain gauges, and in conjunction with or instead of the method using an auto-focus mechanism as described above. However, it will be appreciated that unlike the methods using strain gauges or auto-focus, this method may be utilized with plates in which the wells are not displaceable.

It will be appreciated that the embodiments shown in the figures are for illustrative purposes only and that variations of these are contemplated within the scope of the invention. For example, the number of wells per plate, the shape of the wells, and the materials used may differ what is shown or specifically described herein, as may the means for detecting adding or removal of liquid from the plate. Additionally, each of the wells may include additional layers or inserts, such as well inserts in which cells are grown such that reagents can be added to the environment of the well for osmosis of the reagent into the well without directly engaging the cells grown in the insert.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the scope of the appended claims.

Citation or identification of any reference in this application shall not be construed as an admission that such reference is available as prior art to the invention.

Section headings are used herein to ease understanding of the specification and should not be construed as necessarily limiting.

The invention claimed is:

1. A plate, comprising:
a first substantially planar surface having at least one first aperture defined therein;
a second substantially planar surface substantially parallel to said first substantially planar surface, said second substantially planar surface being spaced from said first substantially planar surface;
at least one well located substantially within said plate, said at least one well having a second aperture associated with one of said at least one first aperture and in alignment therewith, said at least one well having a sidewall and a bottom, a major portion of said at least one well extending from the vicinity of said first substantially planar surface toward said second substantially planar surface, said major portion of said at least one well being displaceable within the region between the first and second substantially planar surfaces away from said first substantially planar surface toward said second substantially planar surface; and
at least one signal provider, functionally associated with said at least one well, capable of producing a signal in response to displacement of said major portion of said at least one well away from said first surface toward said second substantially planar surface,
wherein said first and second surfaces are spaced apart by a plurality of sidewalls extending between said first and second surfaces.

2. The plate of claim 1, wherein:
said first surface has a plurality of first apertures defined therewithin; and
a plurality of wells are located substantially within said plate, each well having a second aperture associated with a first aperture of said plurality of first apertures defined in said first surface and in alignment therewith, each of said wells having a sidewall and a bottom and a major portion of each well extending from the vicinity of said first substantially planar surface toward said second substantially planar surface, each of said plurality of wells being displaceable away from said first substantially planar surface.

3. The plate of claim 2, wherein movement of all said wells is coupled, so that said signal provider is capable of providing a single signal in response to displacement of any one or more of said wells.

4. The plate of claim 2, wherein movement of some of said wells is coupled into two or more groups, and said at least one signal provider comprises multiple signal providers, each capable of providing a signal in response to displacement of one of said groups.

5. The plate of claim 2, wherein:
said at least one signal provider comprises a plurality of signal providers, each associated with one well of said plurality of wells;
said major portion of each of said plurality of wells is independently displaceable away from said first surface; and
each of said plurality of signal providers is capable of providing a signal in response to displacement of said major portion of one of said plurality of wells associated therewith.

6. The plate of claim 1, wherein said at least one signal provider is capable of providing a signal in response to at least one of the following:
(a) placement in said well of 300 milligrams of material, 250 milligrams of material, 200 milligrams of material, 150 milligrams of material, 100 milligrams of material, 75 milligrams of material, 50 milligrams of material, 45 milligrams of material, 40 milligrams of material, 35 milligrams of material, 30 milligrams of material, 25 milligrams of material, 20 milligrams of material, 15 milligrams of material, 10 milligrams of material, 5 milligrams of material, 4 milligrams of material, 3 milligrams of material, 2 milligrams of material, or 1 milligram of material, 500 micrograms (µg) of material, 300 µg of material, 200 µg of material, or 100 µg of material; and
(b) placement in said well of 300 microliters (µl) of fluid, 250 µl of fluid, 200 µl of fluid, 150 µl of fluid, 100 µl of fluid, 75 µl of fluid, 50 µl of fluid, 45 µl of fluid, 40 µl of fluid, 35 µl of fluid, 30 µl of fluid, 25 µl of fluid, 20 µl of fluid, 15 µl of fluid, 10 µl of fluid, 5 µl of fluid, 4 µl of fluid, 3 µl of fluid, 2 µl of fluid, 1 µl of fluid, 0.5 µl of fluid, 0.3 µl of fluid, 0.5 µl of fluid, or 0.1 µl of fluid.

7. The plate of claim 1, wherein said signal provider is capable of providing a signal in response to displacement of said major portion of at least one said well toward said first surface in the region between said first and second substantially planar surfaces.

8. The plate of claim 1, wherein said at least one signal provider is capable of providing a signal in response to at least one of the following:
(a) removal from a well of 300 milligrams of material, 250 milligrams of material, 200 milligrams of material, 150 milligrams of material, 100 milligrams of material, 75 milligrams of material, 50 milligrams of material, 45 milligrams of material, 40 milligrams of material, 35 milligrams of material, 30 milligrams of material, 25 milligrams of material, 20 milligrams of material, 15 milligrams of material, 10 milligrams of material, 5 milligrams of material, 4 milligrams of material, 3 milligrams of material, 2 milligrams of material, or 1 milligram of material, 500 micrograms (µg) of material, 300 µg of material, 200 µg of material, or 100 µg of material; and
(b) removal from a well of 300 microliters (µl) of fluid, 250 µl of fluid, 200 µl of fluid, 150 µl of fluid, 100 µl of fluid, 75 µl of fluid, 50 µl of fluid, 45 µl of fluid, 40 µl of fluid, 35 µl of fluid, 30 µl of fluid, 25 µl of fluid, 20 µl of fluid, 15 µl of fluid, 10 µl of fluid, 5 µl of fluid, 4 µl of fluid, 3 µl of fluid, 2 µl of fluid, 1 µl of fluid, 0.5 µl of fluid, 0.3 µl of fluid, 0.2 µl of fluid, 0.1 µl of fluid.

9. The plate of claim 1, wherein the plate comprises at least one temperature sensor associated with at least one of said wells, said at least one temperature sensor being configured to provide a signal representing a temperature in said at least one well or in a vicinity thereof.

10. The plate of claim 9, wherein said at least one temperature sensor is configured to continuously detect the temperature in said at least one well, and to periodically provide said signal representing said temperature.

11. The plate of claim 9, further comprising an electronic storage element for storage of at least one signal provided by at least one of said at least one signal provider and said at least one temperature sensor.

12. The plate of claim 1, further comprising at least one heating component associated with said at least one well, said at least one heating component being located in sufficient proximity to said at least one well to heat said at least one well or its interior.

13. The plate of claim 12, wherein said at least one heating component is also capable of cooling said at least one well.

14. The plate of claim 1, further comprising an electrical port functionally associated with said at least one signal provider.

15. A multiwell plate, comprising:
a first substantially planar surface having a plurality of first apertures defined therein;
a second substantially planar surface substantially parallel to said first substantially planar surface, said second substantially planar surface being spaced from said first substantially planar surface;
a plurality of wells located substantially within said plate, each well having a second aperture associated with one of said first apertures defined in said first surface and in alignment therewith, each of said wells having a sidewall and a bottom, a major portion of each well extending from the vicinity of said first substantially planar surface toward said second substantially planar surface, each of said major portion of said wells being displaceable within the region between the first and second substantially planar surfaces away from said first substantially planar surface toward said second substantially planar surface; and
at least one signal provider, functionally associated with said plurality of wells, capable of producing a signal in response to displacement of said major portion of said at least one said well away from said first surface,
wherein said first and second surfaces are spaced apart by a plurality of sidewalls extending between said first and second surfaces.

16. The plate of claim 15, wherein movement of all said wells is coupled, so that said signal provider is capable of providing a single signal in response to displacement of any one or more of said wells.

17. The plate of claim 15, wherein movement of some of said wells is coupled into two or more groups, and said at least one signal provider comprises multiple signal providers, each capable of providing a signal in response to displacement of one of said groups.

18. The plate of claim 15, wherein:
said at least one signal provider comprises a plurality of signal providers, each associated with one well of said plurality of wells;
said major portion of each of said plurality of wells is independently displaceable away from said first surface; and
each of said plurality of signal providers is capable of providing a signal in response to displacement of said majority portion of one of said plurality of wells associated therewith.

19. The plate of claim 15, wherein the plate comprises at least one temperature sensor associated with at least one of said wells, said at least one temperature sensor being configured to provide a signal representing a temperature in said at least one well or in a vicinity thereof.

20. The plate of claim 1, wherein said at least one signal provider is capable of providing a signal in response to at least one of the following:
(a) placement in said well of at least 5 milligrams of material; and
(b) placement in said well of at least 5 µl of fluid.

21. The plate of claim 15, wherein said at least one signal provider is capable of providing a signal in response to at least one of the following:
(a) placement in a well of at least 5 milligrams of material; and
(b) placement in a well of at least 5 µl of fluid.

22. The plate of claim 2, wherein said signal provider is capable of providing a signal in response to displacement of said major portion of at least one said well toward said first surface in the region between said first and second substantially planar surfaces.

23. The plate of claim 1, wherein said at least one signal provider is capable of providing a signal in response to at least one of the following:
(a) removal from a well of 5 or more milligrams of material; and
(b) removal from a well of 5 µl or more of fluid.

24. The plate of claim 15, wherein said at least one signal provider is capable of providing a signal in response to at least one of the following:
(a) removal from a well of 5 or more milligrams of material; and
(b) removal from a well of 5 µl or more of fluid.

25. The plate of claim 15, wherein at least one well in said plate is removable therefrom.

26. The plate of claim 15, further comprising an electronic storage element for storage of at least one signal provided by said at least one signal provider.

27. The plate of claim 12, wherein said at least one heating component comprises a plurality of heating components, each associated with one well of said plurality of wells and located in sufficient proximity to said one well associated therewith to heat said one well or its interior, without substantially heating others of said plurality of wells.

28. The plate of claim 15, further comprising an electrical port functionally associated with said at least one signal provider.

\* \* \* \* \*